United States Patent
Oustry et al.

(10) Patent No.: US 12,504,734 B2
(45) Date of Patent: Dec. 23, 2025

(54) SYSTEMS AND METHODS FOR A RESOLVER AND MOTOR CONTROL WITH ENHANCED SPEED AND DIRECTION MONITORING

(71) Applicant: Parker-Hannifin Corporation, Cleveland, OH (US)

(72) Inventors: Gerard Oustry, Acreau (FR); David T. Blood, West Sussex (GB); Patrick C. Toops, Charleston, WV (US); William Beach, Cumming, GA (US); Sai Kiran Gunti, Parma, OH (US)

(73) Assignee: Parker-Hannifin Corporation, Cleveland, OH (US)

( * ) Notice: Subject to any disclaimer, the term of this patent is extended or adjusted under 35 U.S.C. 154(b) by 143 days.

(21) Appl. No.: 18/566,715

(22) PCT Filed: May 24, 2022

(86) PCT No.: PCT/US2022/030632
§ 371 (c)(1),
(2) Date: Dec. 4, 2023

(87) PCT Pub. No.: WO2023/027790
PCT Pub. Date: Mar. 2, 2023

(65) Prior Publication Data
US 2024/0369986 A1    Nov. 7, 2024

Related U.S. Application Data

(60) Provisional application No. 63/235,833, filed on Aug. 23, 2021.

(51) Int. Cl.
*H02P 6/17*    (2016.01)
*G01P 3/46*    (2006.01)
(Continued)

(52) U.S. Cl.
CPC ............ *G05B 19/33* (2013.01); *G01P 3/46* (2013.01); *G01P 13/045* (2013.01);
(Continued)

(58) Field of Classification Search
CPC . G05B 19/33; G05B 2219/37473; H02P 6/30; H02P 6/17; G01P 3/46; G01P 3/481;
(Continued)

(56) References Cited

U.S. PATENT DOCUMENTS

| | | | |
|---|---|---|---|
| 4,926,037 A | 5/1990 | Martin-Lopez | |
| 5,646,496 A * | 7/1997 | Woodland | G08C 19/46 318/632 |

(Continued)

FOREIGN PATENT DOCUMENTS

| | | |
|---|---|---|
| CN | 101521480 B | 10/2020 |
| CN | 112511061 A | 3/2021 |

(Continued)

OTHER PUBLICATIONS

International Search Report and Written Opinion prepared by the European Patent Office in International Patent Application No. PCT/US2022/030632 dated Oct. 6, 2022.

(Continued)

*Primary Examiner* — Gabriel Agared
(74) *Attorney, Agent, or Firm* — McDonnell Boehnen Hulbert & Berghoff LLP

(57) ABSTRACT

A method includes receiving a sine feedback signal and a cosine feedback signal from a resolver coupled to an output shaft of an electric motor. Rectified sine and cosine signals are generated by sampling the feedback signals. A direction of rotation of the output shaft is determined using the feedback signals and the rectified signals. The rectified sine signal and the rectified cosine signal are converted into a signed sine signal and a signed cosine signal, respectively, (Continued)

using information associated with the direction of rotation. A speed of rotation of the output shaft is determined using the signed sine signal and the signed cosine signal. The direction and the speed of rotation are compared to a respective direction and a respective speed determined by a resolver-to-digital converter. The electric motor is operated based on the comparison.

20 Claims, 19 Drawing Sheets

(51) Int. Cl.
  *G01P 13/04* (2006.01)
  *G05B 19/33* (2006.01)
  *H02P 6/30* (2016.01)
  *G01D 5/245* (2006.01)

(52) U.S. Cl.
  CPC ....... *G01D 5/2455* (2013.01); *G01D 2205/26* (2021.05); *G05B 2219/37473* (2013.01)

(58) Field of Classification Search
  CPC . G01P 13/045; G01D 5/2455; G01D 2205/26
  USPC ......................................................... 318/605
  See application file for complete search history.

(56) References Cited

U.S. PATENT DOCUMENTS

| | | | | |
|---|---|---|---|---|
| 7,119,536 B2 * | 10/2006 | Miya | .................... | G01D 5/2073 |
| | | | | 318/653 |
| 7,205,916 B1 * | 4/2007 | Stolan | .................. | H03M 1/485 |
| | | | | 341/111 |
| 8,541,964 B2 * | 9/2013 | Sakaguchi | ................ | H02P 6/34 |
| | | | | 318/400.39 |
| 9,791,299 B2 | 10/2017 | Goto et al. | | |
| 10,884,037 B2 | 1/2021 | Chellamuthu et al. | | |
| 10,911,061 B2 | 2/2021 | Cameron et al. | | |
| 11,031,887 B2 | 6/2021 | Cha et al. | | |
| 2004/0233078 A1 * | 11/2004 | Takehara | ............... | H03M 1/645 |
| | | | | 341/116 |
| 2005/0252272 A1 | 11/2005 | Otsuka et al. | | |
| 2006/0132338 A1 * | 6/2006 | Katakura | ............... | G01D 5/244 |
| | | | | 341/112 |
| 2007/0296368 A1 * | 12/2007 | Woodland | .............. | G05B 11/42 |
| | | | | 318/609 |
| 2015/0207444 A1 | 7/2015 | Son et al. | | |
| 2019/0296761 A1 * | 9/2019 | Cameron | ............. | G01C 21/188 |

FOREIGN PATENT DOCUMENTS

| | | |
|---|---|---|
| CN | 112 689 952 A | 4/2021 |
| EP | 1 630 526 A2 | 3/2006 |
| EP | 3 865 826 A1 | 8/2021 |
| EP | 3 944 487 A1 | 1/2022 |
| JP | 6124112 B2 | 5/2017 |

OTHER PUBLICATIONS

Preliminary Rejection issued by the Korean Patent Office in application No. KR-10-2024-7005942 dated Oct. 18, 2025.

* cited by examiner

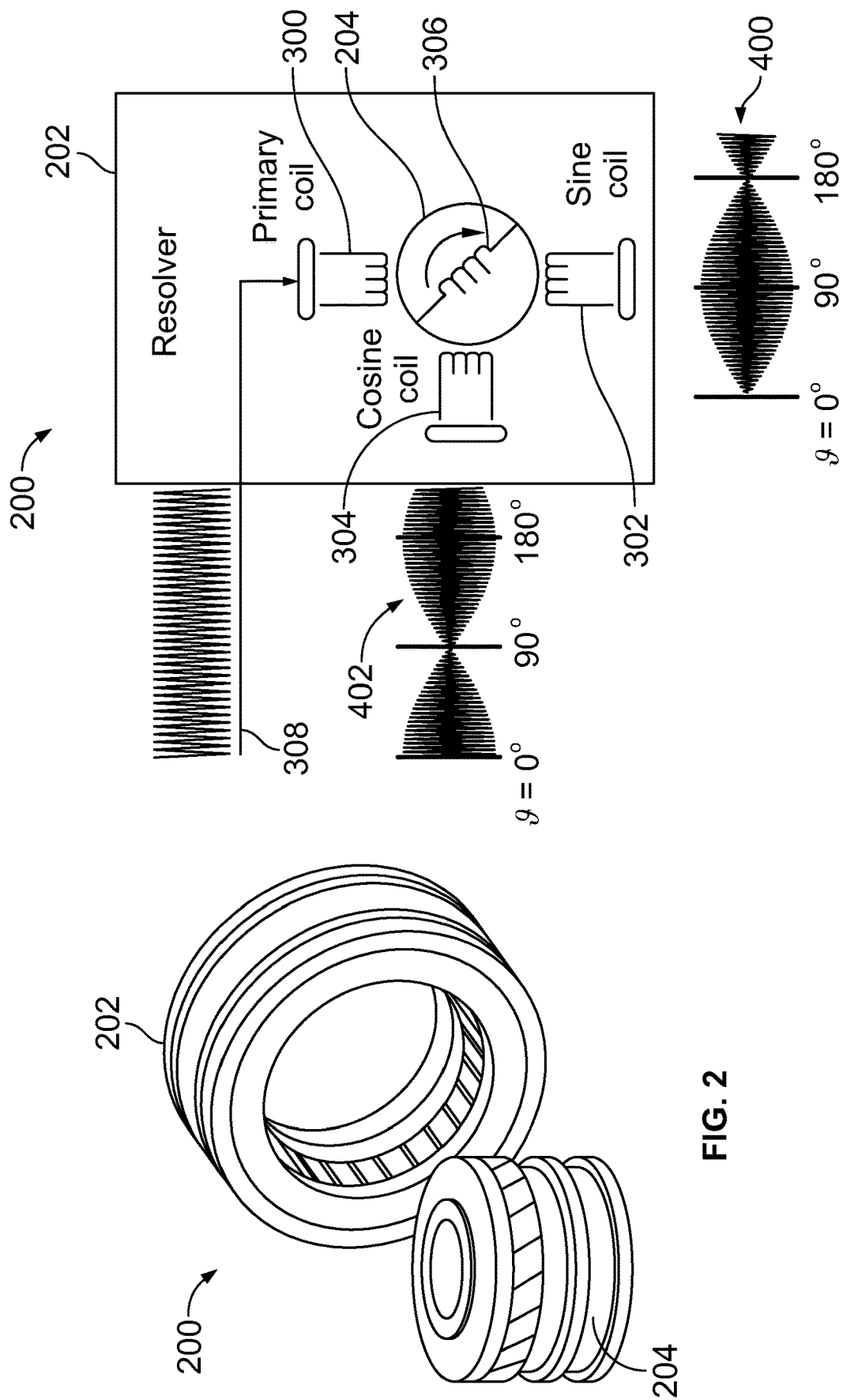

SYSTEMS AND METHODS FOR A RESOLVER AND MOTOR CONTROL WITH ENHANCED SPEED AND DIRECTION MONITORING

CROSS REFERENCE TO RELATED APPLICATION

The present application claims priority to U.S. Provisional patent application No. 63/235,833, filed on Aug. 23, 2021, the entire contents of all of which is herein incorporated by reference as if fully set forth in this description.

BACKGROUND

Electric motors are used in variety of applications such as industrial facilities, vehicles (e.g., electric cars), and mobile hydraulic machinery (e.g., wheel loaders, excavators, etc.). For instance, an electric motor can drive a pump, which then provides fluid flow to drive hydraulic actuators. In another example, electric motors are used in electric vehicle cars.

An electric motor can include a rotary position sensor configured to provide sensor information indicative of a position, speed, and/or direction of rotation of the output shaft of the motor. A motor controller then receives the sensor information and implements closed-loop feedback control to control speed and torque of the motor.

Motor controllers of existing electric motor systems might not have a way of assessing whether the sensor information are accurate or whether an error has occurred (e.g., whether the sensor or signal processing of the sensor has malfunctioned and produced erroneous feedback). As such, existing motor systems do not have a high level of functional safety. For instance, if the sensor malfunctions and the sensor signals are inaccurate, the motor controller may continue operating the motor based on such inaccurate information, which can be hazardous.

It may be desirable to have enhance the functional safety of the electric motors. Particularly, it may be desirable to check signal integrity of the rotary position sensor signals and implement additional processing to increase confidence level in the speed and direction estimates determined based on the sensor signals. This way, functional safety of the motor can be enhanced and corrective safety measures can be implemented if the controller detects any discrepancies.

It is with respect to these and other considerations that the disclosure made herein is presented.

SUMMARY

The present disclosure describes implementations that relate to systems and methods for a resolver and motor control with enhanced speed and direction monitoring.

In a first example implementation, the present disclosure describes a method. The method includes: receiving, at a motor controller, a sine feedback signal and a cosine feedback signal from a resolver coupled to an output shaft of an electric motor, wherein the sine feedback signal and the cosine feedback signal modulate an excitation signal provided to the resolver; generating a rectified sine signal and a rectified cosine signal by way of sampling the sine feedback signal and the cosine feedback signal at a frequency less than a respective frequency of the excitation signal; determining, by the motor controller, a direction of rotation of the output shaft using the sine feedback signal, the cosine feedback signal, the rectified sine signal, and the rectified cosine signal; converting the rectified sine signal and the rectified cosine signal into a signed sine signal and a signed cosine signal, respectively, using information associated with determining the direction of rotation; determining, by the motor controller a speed of rotation of the output shaft using the signed sine signal and the signed cosine signal; comparing the direction and the speed of rotation determined by the motor controller to a respective direction and a respective speed determined by a resolver-to-digital converter using the sine feedback signal and the cosine feedback signal; and operating, by the motor controller, the electric motor based on the comparing.

In a second example implementation, the present disclosure describes an electric motor. The electric motor includes: a resolver comprising: (i) a resolver stator having a primary coil, a sine coil, and a cosine coil, and (ii) a resolver rotor mounted to, and configured to rotate with, an output shaft of the electric motor, wherein the resolver rotor comprises a secondary coil; a resolver-to-digital converter configured to (i) provide an excitation signal to the primary coil of the resolver stator, wherein the excitation signal excites the secondary coil of the resolver rotor, thereby generating a sine feedback signal in the sine coil and a cosine feedback signal in the cosine coil, (ii) receive the sine feedback signal and the cosine feedback signal, and (iii) determine a direction and speed of rotation of the output shaft using the sine feedback signal and the cosine feedback signal; and a motor controller. The motor controller includes one or more processors, and a non-transitory computer-readable medium storing thereon instructions that, when executed by the one or more processors, cause the motor controller to perform operations comprising the operations of the method of the first example implementation.

The foregoing summary is illustrative only and is not intended to be in any way limiting. In addition to the illustrative aspects, implementations, and features described above, further aspects, implementations, and features will become apparent by reference to the figures and the following detailed description.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying Figures.

FIG. 2 illustrates an exploded view of a resolver, in accordance with an example implementation.

FIG. 3 illustrates a schematic diagram of a resolver, in accordance with another example implementation.

DETAILED DESCRIPTION

An example electric motor may have a resolver mounted to an output shaft coupled to the rotor of the electric motor. The resolver is configured to provide signals indicative of rotary position, rotational speed, and rotation direction of the rotor. The signals can be processed with a resolver-to-digital converter, which converts the signals received from the resolver to values of position, speed, and direction.

A motor controller receives the output of the resolver-to-digital converter and implements a closed-loop feedback control scheme to control speed and torque of the motor. Disclosed systems and methods involve having another signal processing path parallel to the processing performed by the resolver-to-digital converter to check the integrity of the sensor signals and independently confirm the speed and direction feedback provided by the resolver-to-digital converter.

With this configuration, the motor controller is configured to check the reliability of the output signals of the resolver and the resolver-to-digital converter. If the motor controller detects a discrepancy, it can switch the motor to operate in a safe mode or a reduced performance mode that limits the speeds of the motor to safely operate the system that the motor drives. This way, the functional safety of the system is enhanced.

Figure 1A:
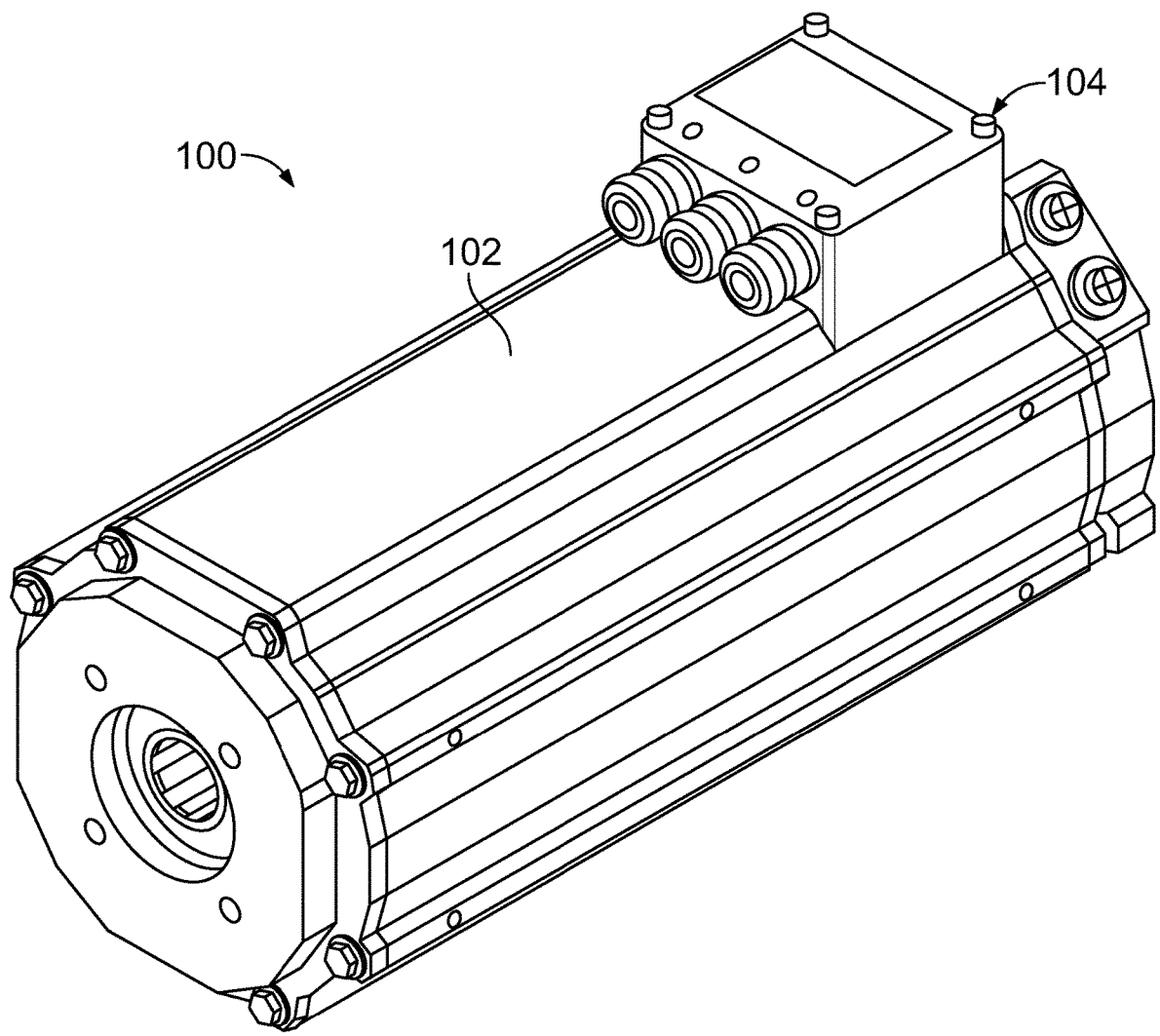
FIG. 1A illustrates a perspective view of an electric motor, in accordance with an example implementation.
Figure 1B:
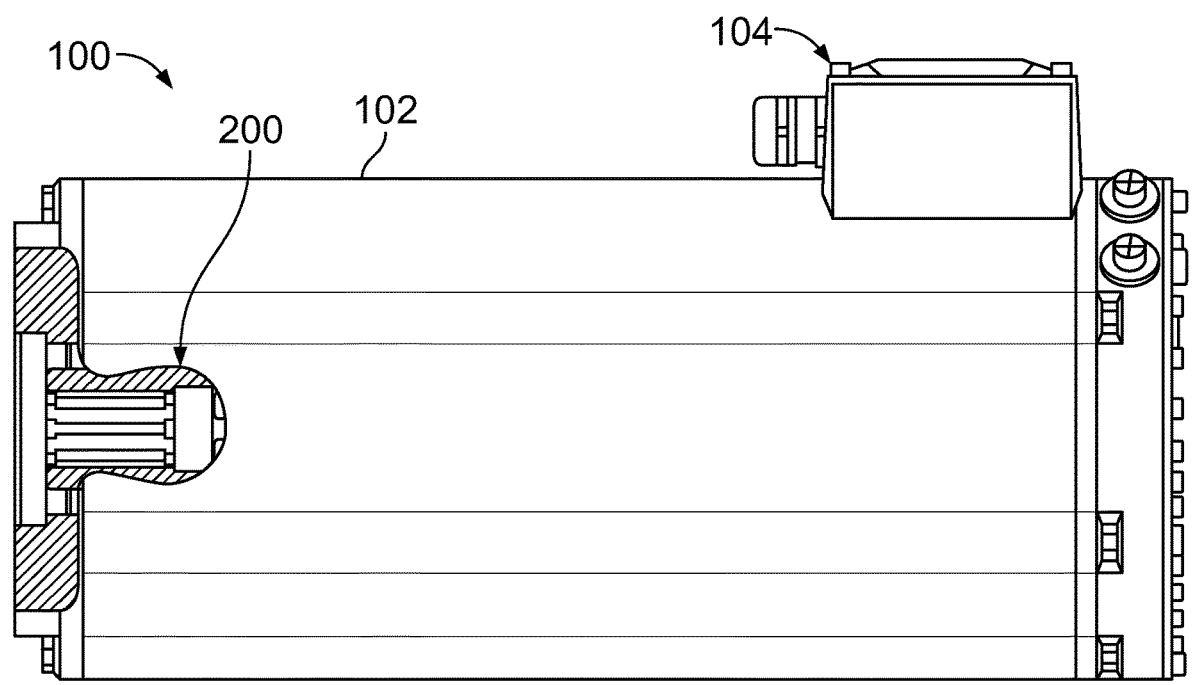
FIG. 1B illustrates a side view of the electric motor of FIG. 1, in accordance with an example implementation.
Figure 1C:
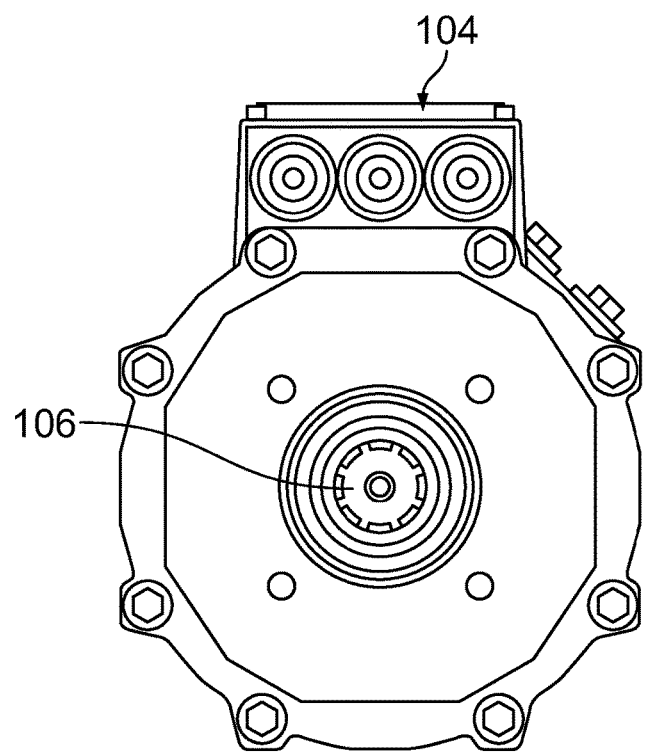
FIG. 1C illustrates a front view of the electric motor of FIG. 1, in accordance with an example implementation.

FIG. 1A illustrates a perspective view of an electric motor 100, FIG. 1B illustrates a side view of the electric motor 100, and FIG. 1C illustrates a front view of the electric motor 100, in accordance with an example implementation. The electric motor 100 has a housing 102 having an internal chamber therein in which components of the electric motor 100 are disposed.

The electric motor 100 includes a stator fixedly-positioned within the internal chamber of the housing 102. The stator can include wire windings wrapped about a body (e.g., a lamination stack) of the stator, and is configured to generate a magnetic field. Particularly, the electric motor 100 can have an electric motor connector 104 where cables can be connected thereto to provide electric power to the electric motor 100, and when electric current is provided through the wire windings of the stator, a magnetic field is generated.

The electric motor 100 further includes a rotor positioned within the stator. The electric motor 100 can further include magnets mounted to the rotor in an annular space between the stator and the rotor. The magnets are configured to interact with the magnetic field generated by the stator in order to rotate the rotor and produce torque. The rotor is coupled to an output shaft 106, which can be coupled to another device (e.g., a pump, a wheel, gearbox, etc.) to be driven by the electric motor 100 via splines, for example.

FIG. 1B illustrates a partial cross section of a back end of the electric motor 100 showing the electric motor 100 further includes a resolver 200 mounted to the output shaft 106. The resolver 200 is configured as an electromagnetic transducer that can be used to provide sensor information indicative of rotary position and speed of the output shaft 106.

FIG. 2 illustrates an exploded view of the resolver 200, and FIG. 3 illustrates a schematic diagram of the resolver 200, in accordance with an example implementation. The resolver 200 can be configured as a rotary transformer having a resolver stator 202 and a resolver rotor 204. The resolver rotor 204 is mounted to the output shaft 106 of the electric motor 100, and thus the resolver rotor 204 rotates with the output shaft 106 in the same direction and at the same rotational speed.

Both the resolver rotor 204 and the resolver stator 202 can be manufactured with multi-slot laminations and two sets of windings. The windings can be configured and distributed in the slotted lamination with either a constant pitch-variable turn or variable pitch-variable turn pattern. In an example, the winding distribution is in a sinusoidal pattern.

In particular, referring to FIG. 3, the resolver stator 202 has three windings: an exciter or primary coil 300, a sine coil 302, and a cosine coil 304. The sine coil 302 and the cosine coil 304 are configured as two-phase windings and are configured to be magnetically-orthogonal relative to each other.

The resolver rotor 204 has a secondary coil 306. The secondary coil 306 thus rotates with the resolver rotor 204. With this configuration, the resolver 200 operates as a rotary transformer. Particularly, an excitation signal 308 having a desired frequency is generated (e.g., generated by a resolver-to-digital converter, such as resolver-to-digital converter 502 described below), where the excitation signal 308 is an alternating-current (AC) signal that passes through the primary coil 300, and induces current/voltage in the secondary coil 306.

As the secondary coil 306 rotates with the output shaft 106 of the electric motor 100, a magnetic field is generated, which in turn excites the sine coil 302 and the cosine coil 304 that are disposed magnetically-orthogonal to each other (e.g., configured at 90 degrees from each other). Due to such excitation, the sine coil 302 and the cosine coil 304 generate a sine feedback signal and a cosine feedback signal, respectively.

Figure 4A:
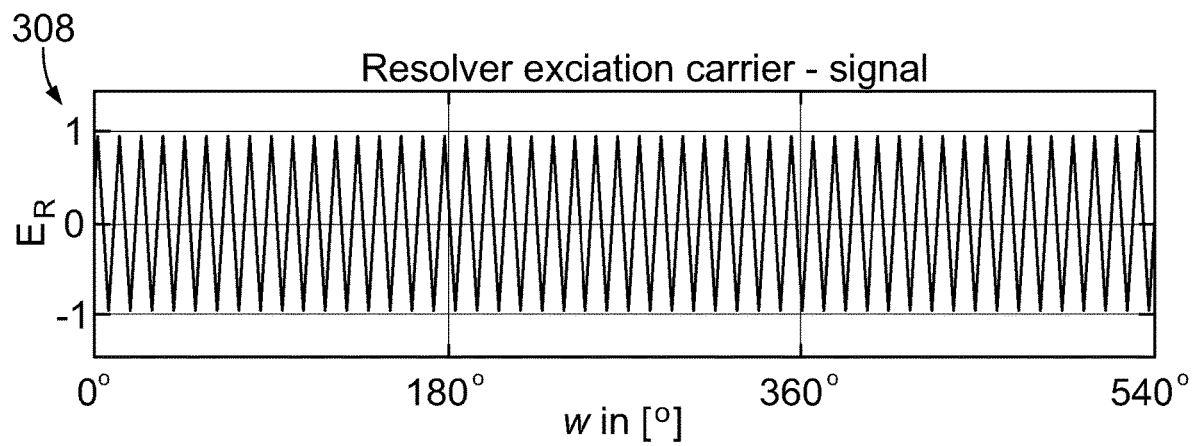
FIG. 4A illustrates a graph of an excitation signal, in accordance with an example implementation.
Figure 4B:
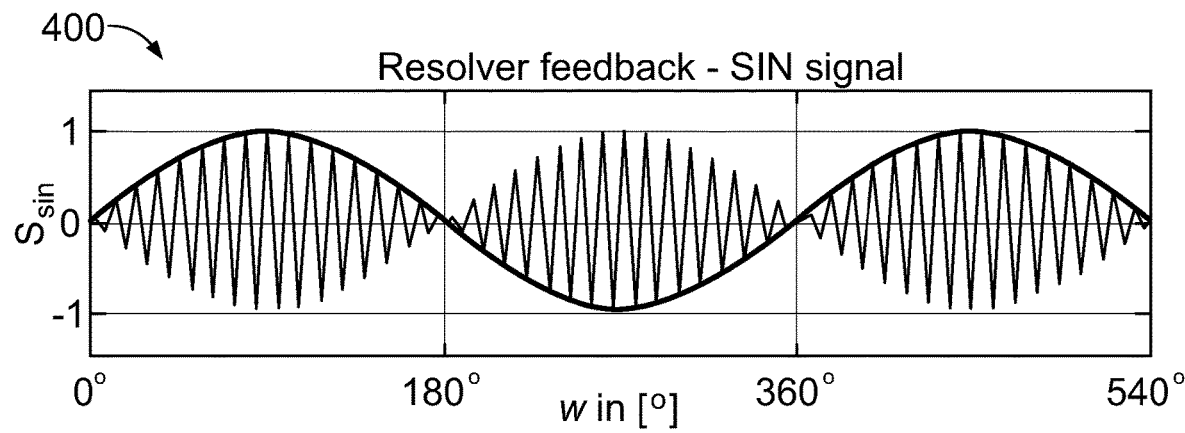
FIG. 4B illustrates a graph of a sine feedback signal generated in a sine coil, in accordance with an example implementation.
Figure 4C:
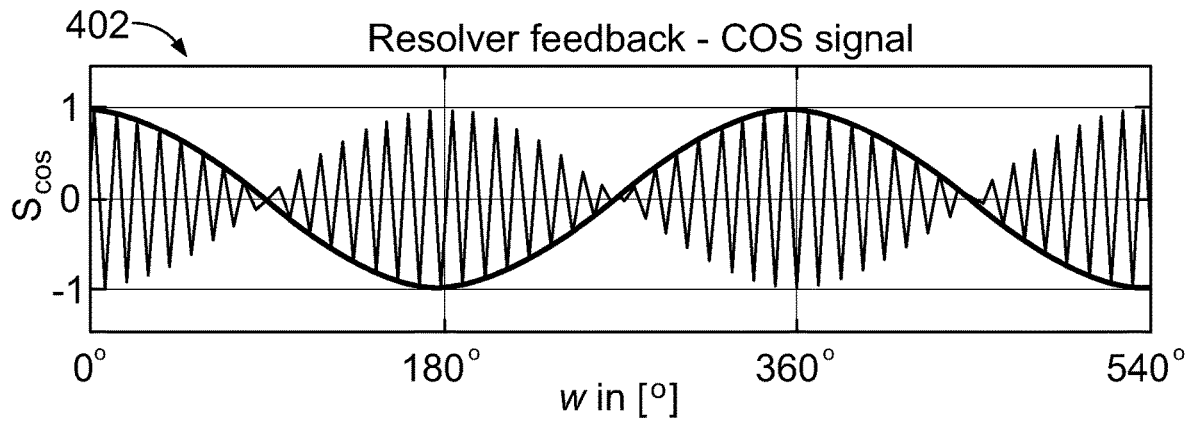
FIG. 4C illustrates a graph of a cosine feedback signal generated in a cosine coil, in accordance with an example implementation.

FIG. 4A illustrates a graph of the excitation signal 308, FIG. 4B illustrates a graph of a sine feedback signal 400 generated in the sine coil 302, and FIG. 4C illustrates a graph of a cosine feedback signal 402 generated in the cosine coil 304, in accordance with an example implementation. As depicted, the sine feedback signal 400 and the cosine feedback signal 402 are low frequency signals that modulate the excitation signal 308 (i.e., the carrier signal) having a high frequency. For example, the carrier signal can have an excitation frequency in the range of 2 Kilo Hertz (KHz) to 20 KHz (e.g., a frequency of 8 KHz), whereas the low frequency signal has a frequency in the range of 0 to 500 Hz (e.g., a frequency of 300 Hz). Thus, the excitation signal 308 operates as a carrier signal, and the sine feedback signal 400 and the cosine feedback signal 402 vary one or more properties (e.g., amplitude) of the excitation signal 308. The sine feedback signal 400 and the cosine feedback signal 402 can therefore be referred to as modulation or modulated signals.

The amplitudes of the sine feedback signal 400 and the cosine feedback signal 402 modulate the excitation signal 308 in proportion to the sine and the cosine of the angle of mechanical rotation of the resolver rotor 204 (and the output shaft 106). As such, the resolver 200 resolves a vector into its sine and cosine components.

The relative magnitudes of the sine feedback signal 400 and the cosine feedback signal 402 are measured and used to determine the angle of the resolver rotor 204 relative to the resolver stator 202. Particularly, the sine feedback signal 400 and the cosine feedback signal 402, which modulate the excitation signal 308, are analog signals that are provided back to the resolver-to-digital converter, where they are processed to provide information indicating position and speed of the resolver rotor 204. The position and speed of the resolver rotor 204 indicate the position and speed of the output shaft 106 to which the resolver rotor 204 is mounted.

As an example, the resolver-to-digital converter can demodulate and filter the sine feedback signal 400 and the cosine feedback signal 402. The resolver-to-digital converter can sample the sine feedback signal 400 and the cosine feedback signal 402 at a particular frequency and determine the angle of the resolver rotor 204 as the arctangent of the sine feedback signal 400 divided by the cosine feedback signal 402 or by using a tracking phase-locked loop. Rotational speed can then be determined via differentiating the rotary position signal over time, by dividing a difference in position by a sampling period, or by using the tracking phase-locked loop.

The determined position and speed are then provided to a microcontroller configured to control the motor. The microcontroller uses the position and speed for the purposes of closed-loop speed and torque control of the electric motor 100.

As the control of the devices driven by the electric motor 100 is dependent on the accuracy of the position and speed information provided by the resolver-to-digital converter, it may be desirable to enhance and monitor the reliability of the output of the resolver-to-digital converter. Particularly, it may be desirable to provide additional monitoring wherein the output signals of the resolver 200 are checked for their integrity. It may also be desirable to perform parallel processing of the resolver signals to independently determine speed and direction of rotation the electric motor 100, and then compare the determined speed and direction with the outputs of the resolver-to-digital converter to ensure the reliability of the speed and direction values. If the signal integrity checks are met and the values of speed and direction agree with the output of the resolver-to-digital converter, the motor controller operates the electric motor 100 in a normal operating mode. If there is a discrepancy, the motor controller can operate the electric motor 100 in a safe operating mode to ensure safety of the system.

Figure 5:
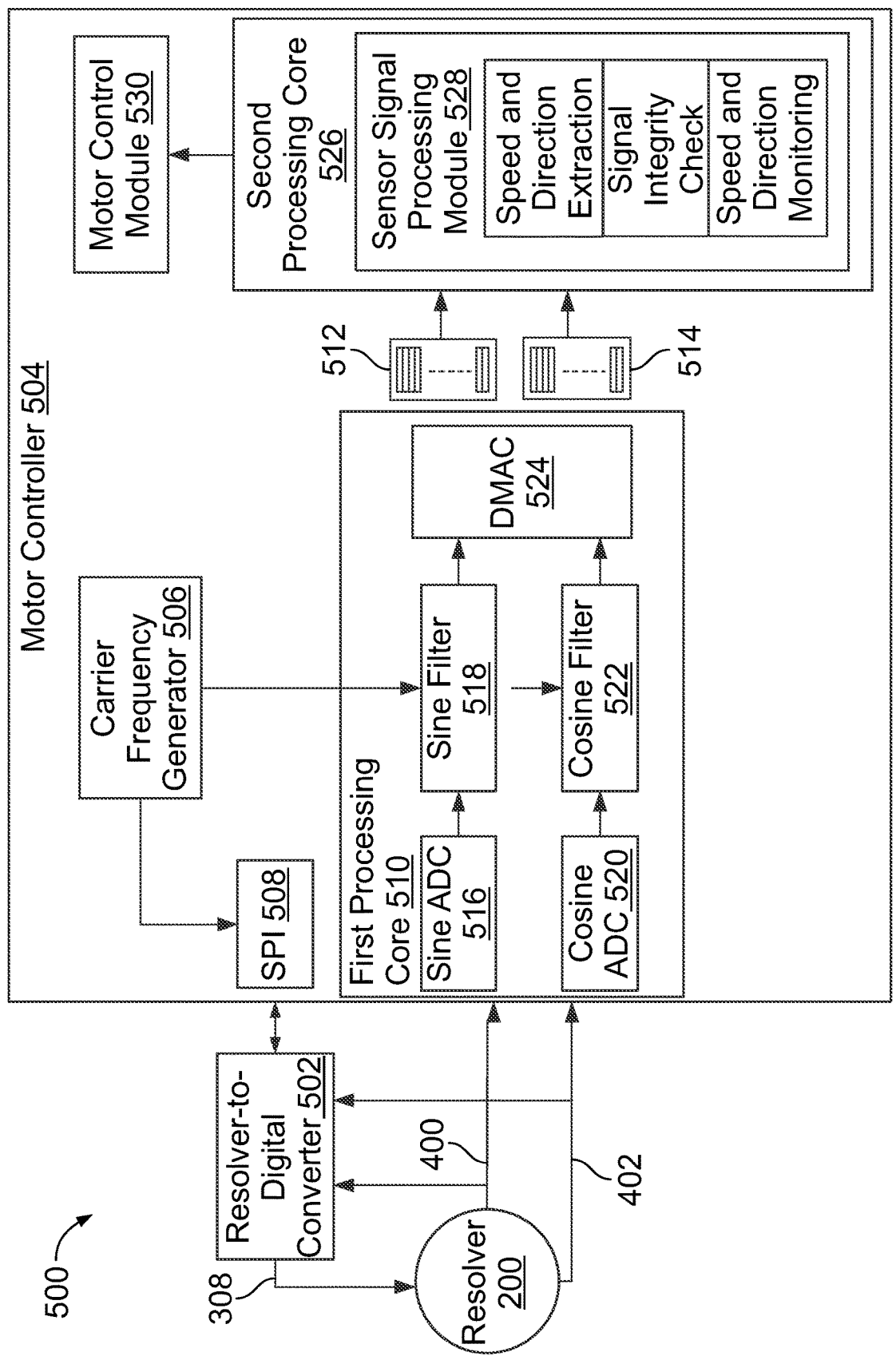
FIG. 5 illustrates a block diagram of a control system of an electric motor, in accordance with an example implementation.

FIG. 5 illustrates a block diagram of a control system 500 of the electric motor 100, in accordance with an example implementation. The control system 500 includes the resolver 200 described above, which is mounted to the output shaft 106 of the electric motor 100.

The control system 500 includes a resolver-to-digital converter 502 and a motor controller 504 in communication with each other. The motor controller 504 can be, for example, a microcontroller having a metal-oxide-semiconductor integrated circuit chip. The motor controller 504 can include one or more processors along with memory and programmable input/output peripherals. A processor can include a general purpose processor (e.g., an INTEL® single core microprocessor or an INTEL® multicore microprocessor), or a special purpose processor (e.g., a digital signal processor, a graphics processor, or an application specific integrated circuit (ASIC) processor). A processor can be configured to execute computer-readable program instructions (CRPI) to perform the operations described throughout herein. A processor can be configured to execute hard-coded functionality in addition to or as an alternative to software-coded functionality (e.g., via CRPI).

The motor controller 504 has a carrier frequency generator 506. The carrier frequency generator 506 is configured to generate a frequency for the excitation signal 308, which excites the primary coil 300 of the resolver stator 202 as described above. In an example, the carrier frequency generator 506 is a module that can have software and hardware modules including a series of dividers, single sideband mixers with filtering, multiplexers, etc. configured to generate the carrier frequency for the excitation signal 308. The term "module" is used generally herein to include software, hardware, or a combination of software and hardware components.

The motor controller 504 can have a communication interface that facilitates communicating with the resolver-to-digital converter 502. As an example, the motor controller 504 can have a serial peripheral interface (SPI) 508, e.g., a synchronous serial communication interface for short-distance communication. The SPI 508 can communicate in full duplex mode using a master-slave architecture and can be referred to as a four-wire serial bus, for example. However, SPI communication is used herein as an example. Parallel interface, or other types of interfaces can be used between the motor controller 504 and the resolver-to-digital converter 502.

The motor controller 504 communicates the carrier frequency generated by the carrier frequency generator 506 via the SPI 508 to the resolver-to-digital converter 502, which then generates the excitation signal 308 and provide it to the primary coil 300 of the resolver stator 202. As described above, the resolver 200 in turn provides the sine feedback signal 400 and the cosine feedback signal 402 back to the resolver-to-digital converter 502, which then determines the position, speed, and direction of rotation of the output shaft 106.

In addition to the sine feedback signal 400 and the cosine feedback signal 402 being provided to the resolver-to-digital converter 502, they also are provided back to the motor controller 504 as illustrated in FIG. 5 for secondary or parallel signal processing. The motor controller 504 can have a first processing module or first processing core 510 configured to convert the sine feedback signal 400 and the cosine feedback signal 402, which are analog modulated signals, into digital or discrete data points placed in data buffers such as sine data buffer 512 and cosine data buffer 514.

For example, the first processing core 510 can have a sine analog-to-digital converter (sine ADC) 516, which converts the sine feedback signal 400 into discrete values at a first sampling frequency (e.g., a high sampling frequency). As an example for illustration, the sine ADC 516 can include a delta-sigma analog-to-digital converter (DS ADC). The DS ADC can first perform delta modulation on the sine feedback signal 400, i.e., the DS ADC can encode the change in the sine feedback signal 400 (its delta), rather than the absolute value. As such, the DS ADC generates a stream of pulses, as opposed to a stream of numbers. In delta-sigma modulation, accuracy of the modulation can be enhanced by passing the digital output through a 1-bit digital-to-analog converter (DAC) and adding (sigma) the resulting analog signal to the sine feedback signal 400 (the signal before delta modulation), thereby reducing the error introduced by the delta modulation. Other ADC scheme can be used.

The output of the sine ADC 516 then passes through a sine demodulator or sine filter 518. As depicted in FIG. 5, the sine filter 518 receives or has access to the carrier frequency generated by the carrier frequency generator 506. The sine filter 518 samples the output of the sine ADC 516 at a second frequency that is less than the carrier frequency (the excitation frequency of the primary coil 300 of the resolver 200). For example, the sine filter 518 can filter or sample the output of the sine ADC 516 at a frequency that is at least 1.6 times less than the carrier frequency. This ensures that the sine data buffer 512 contains at least one full-cycle of the sine feedback signal 400 (the modulated sine signal).

Similarly, the first processing core 510 can have a cosine ADC 520, which converts the cosine feedback signal 402 into discrete values at a high sampling frequency. As an example for illustration, the cosine ADC 520 can include a DS ADC that operates as described above. The output of the cosine ADC 520 then passes through a cosine demodulator or cosine filter 522, which similar to the sine filter 518, has access to the carrier frequency generated by the carrier frequency generator 506. The cosine filter 522 is configured to filter or sample the output of the cosine ADC 520 at a frequency that is less than the carrier frequency (e.g., a frequency that is at least 1.6 times less than the carrier frequency). This ensures that the cosine data buffer 514 contains at least one full-cycle of the cosine feedback signal 402 (the modulated cosine signal).

As such, the first processing core 510 converts the sine feedback signal 400 and the cosine feedback signal 402, which are analog modulated signals, into discrete values using dual synchronized ADCs (e.g., DS ADCs) running at a high sample rate. The converted samples are placed or windowed in two buffers, i.e., the sine data buffer 512 and the cosine data buffer 514, respectively.

Figure 6:
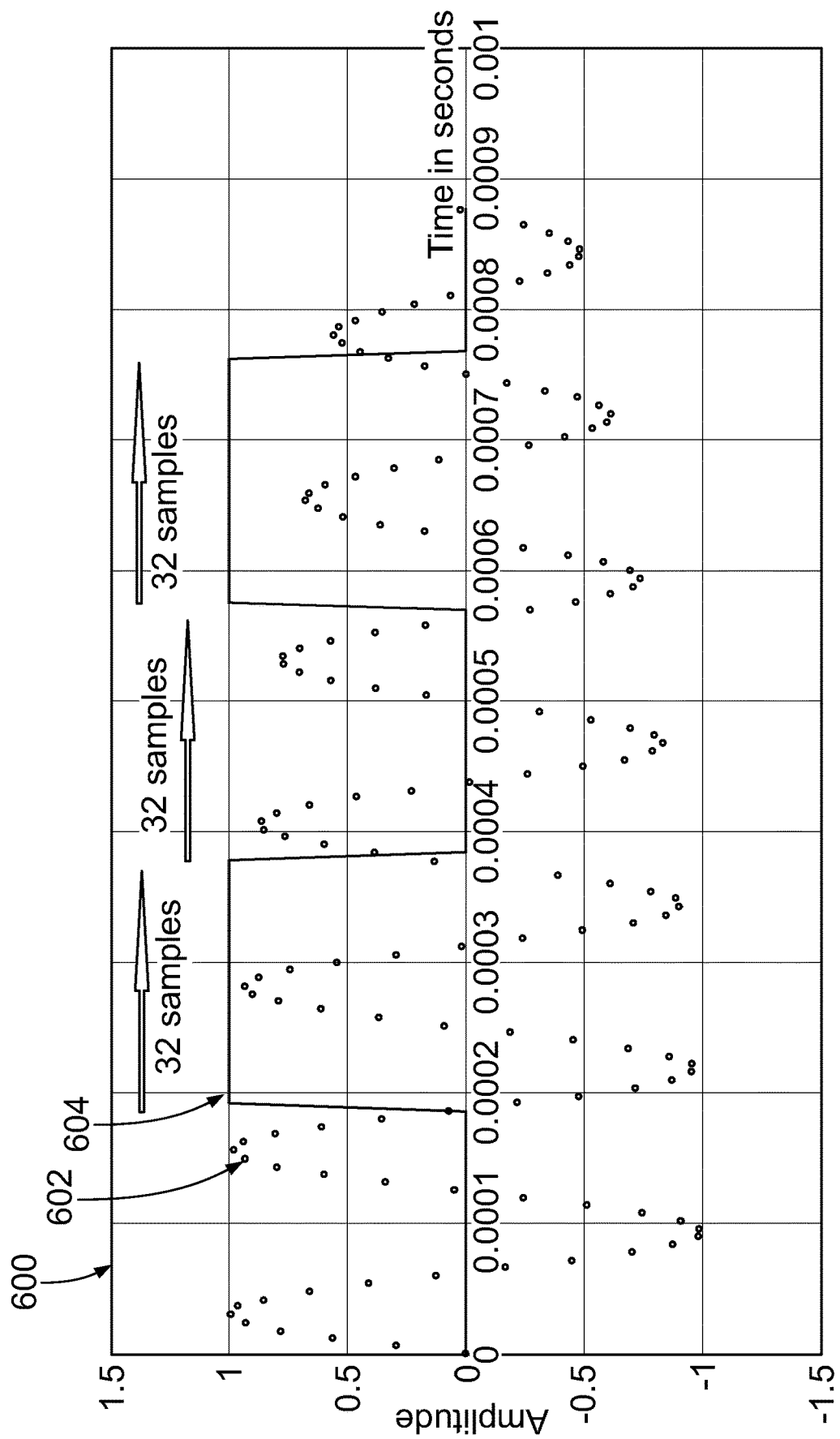
FIG. 6 illustrates a graph showing sampled data and applied windows, in accordance with an example implementation.

FIG. 6 illustrates a graph 600 showing sampled data and applied windows, in accordance with an example implementation. FIG. 6 shows each window having 32 samples as an example for illustration. Other numbers of samples can be used (e.g., 64, 128, etc.). As shown in FIG. 6, discrete values 602 are extracted, for example, from the sine feedback signal 400, and then a square or trapezoidal wave 604 is applied to divide the values into windows of 32 samples in each window.

The data buffer window is not synchronized with the sine feedback signal 400. As mentioned above, the frequency of the data buffer window is chosen to be less than (e.g., 1.6 times less than) the carrier frequency generated by the carrier frequency generator 506 to ensure that each buffer of the sine data buffer 512 and the cosine data buffer 514 (i.e., each data buffer window) has one complete cycle of the sine feedback signal 400 and the cosine feedback signal 402, respectively.

This way, the data in the sine data buffer 512 and the cosine data buffer 514 represents an unsynchronized window of the modulated sine and cosine signals, i.e., the sine feedback signal 400 and the cosine feedback signal 402. The lower sampling frequency ensures that each buffer of the sine data buffer 512 and the cosine data buffer 514 contains at least one full-cycle of a modulated sine or cosine signal, respectively.

Referring back to FIG. 5, the first processing core 510 can further include a direct memory access controller, DMAC 524 configured to provide access to the sine data buffer 512 and the cosine data buffer 514. Particularly, the motor controller 504 further includes a second processing core 526, and the DMAC 524 is configured to pass the sine data buffer 512 and the cosine data buffer 514 by direct memory access (DMA) to the second processing core 526.

As an example, the DMAC 524 can be configured as a hardware device that allows the second processing core 526 to directly access the memory in first processing core 510 storing the sine data buffer 512 and the cosine data buffer 514 with less participation of, or independently from, the first processing core 510. The DMAC 524 can have electronic circuits of an interface to communicate with the second processing core 526.

In an example, the first processing core 510 and the second processing core 526 are configured to be lockstep cores where their clock cycles are synchronized to protect against transient errors. The second processing core 526 includes a sensor signal processing module 528 that is configured to perform several operations on the data of the sine data buffer 512 and the cosine data buffer 514. Particularly, the second processing core 526 can perform operations including: (i) checking integrity of signals provided by the resolver 200; (ii) extracting amplitude of the sine feedback signal 400 and the cosine feedback signal 402; (iii) extracting direction of rotation of from the sine feedback signal 400 and the cosine feedback signal 402; (iv) extracting rotational speed from the sine feedback signal 400 and the cosine feedback signal 402; (v) monitoring resolver direction functional safety; and (vi) monitoring resolver speed functional safety.

Figure 7:
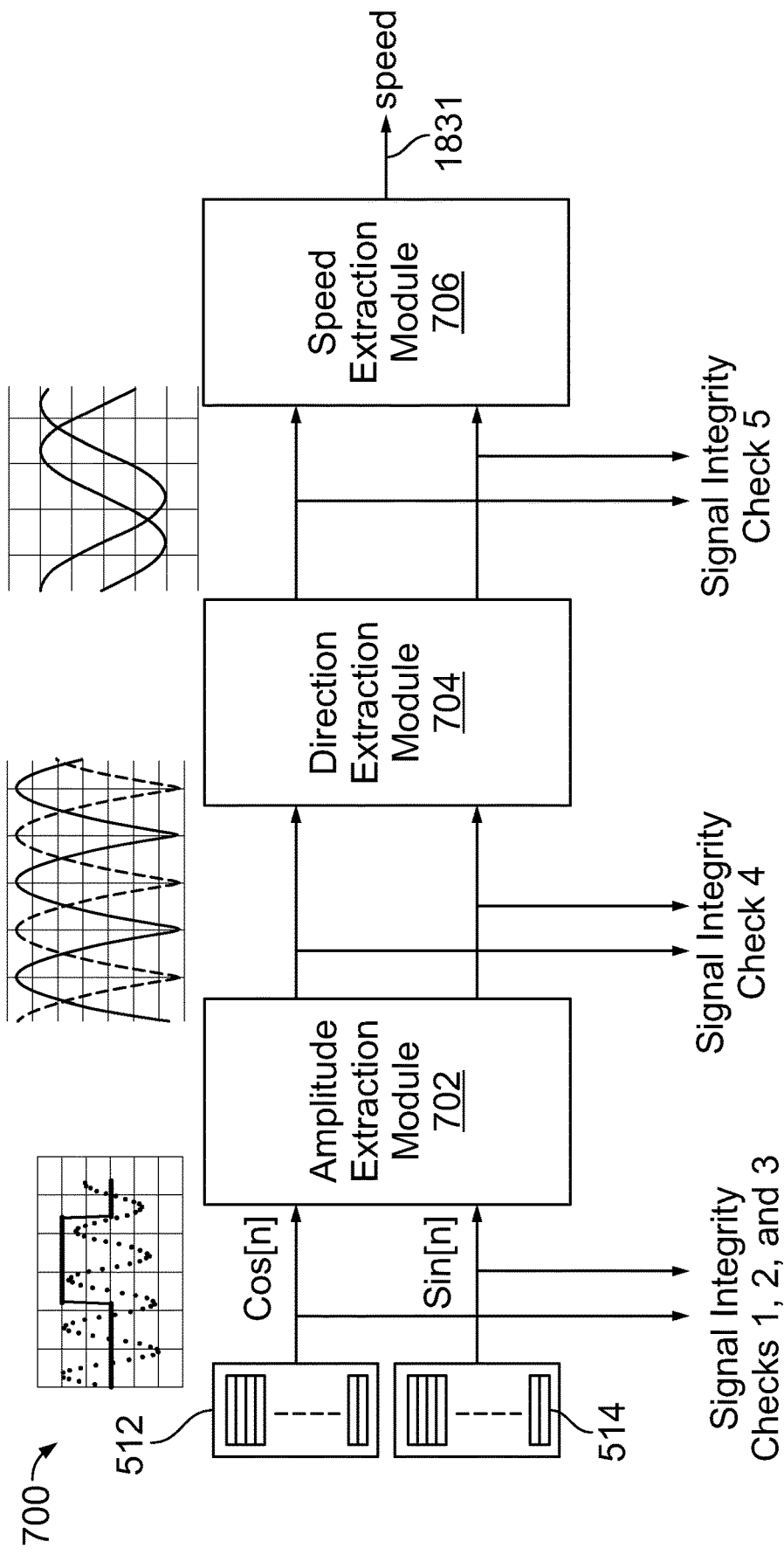
FIG. 7 illustrates a block diagram of a sensor signal processing module, in accordance with an example implementation.

FIG. 7 illustrates a partial block diagram 700 of the sensor signal processing module 528, in accordance with an example implementation. The sensor signal processing module 528 includes at least three processing modules: an amplitude extraction module 702, a direction extraction module 704, and a speed extraction module 706. The sensor signal processing module 528 further includes other modules such as resolver speed monitor 1900, and resolver direction monitor 2000, and performs other processes such as perform signal integrity checks as described below.

The amplitude extraction module 702 receives values stored in the sine data buffer 512 and the cosine data buffer 514, which include sampled values of the raw modulated sine and cosine feedback signals provided by the resolver 200 (i.e., of the sine feedback signal 400 and the cosine feedback signal 402). The amplitude extraction module 702 then extracts amplitudes of the modulated signals. Particularly, the amplitude extraction module 702 identifies and isolates the first positive half-cycle or the first negative half-cycle (whichever occurs first) of the modulated sine and cosine in each window of the sine data buffer 512 and the cosine data buffer 514.

Figure 8:
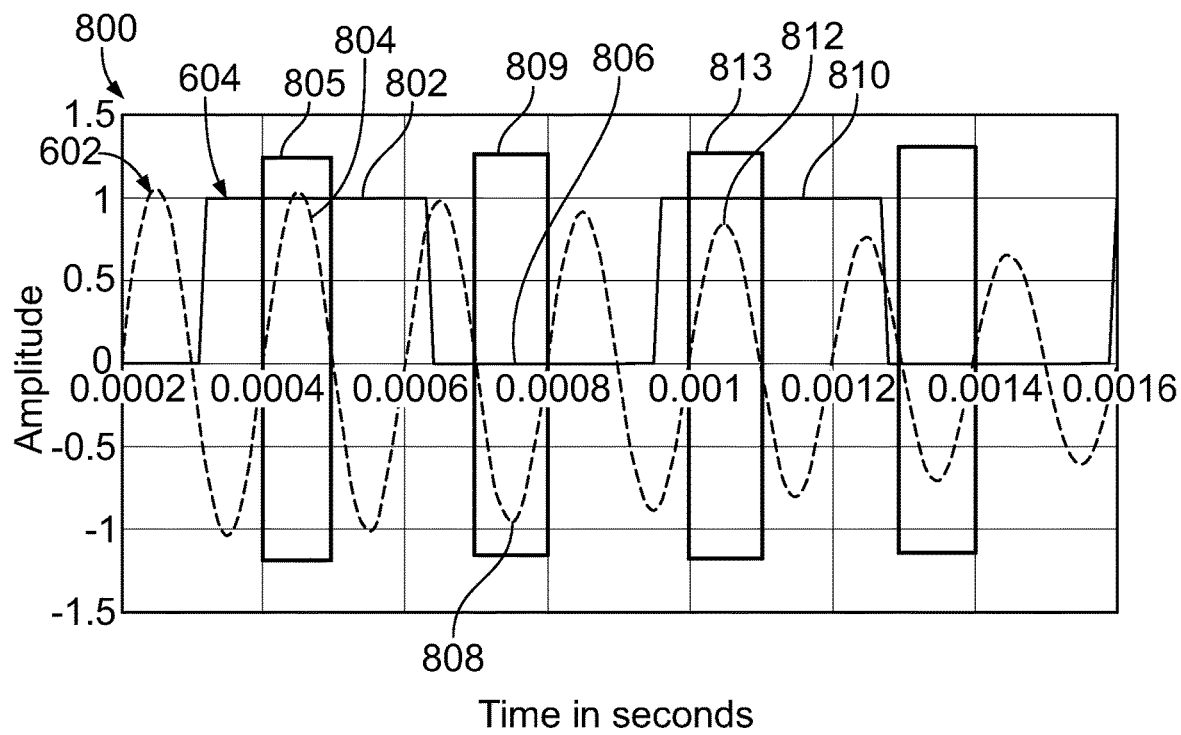
FIG. 8 illustrates a graph showing identification and isolation of positive half-cycle or negative half-cycle, whichever occurs first, within each window of FIG. 6, in accordance with an example implementation.

FIG. 8 illustrates a graph 800 showing identification and isolation of positive half-cycle or negative half-cycle, whichever occurs first, within each window of FIG. 6, in accordance with an example implementation. For example, within window 802, the amplitude extraction module 702 identifies a positive half-cycle 804 defined within sub-window 805 as the first complete positive half-cycle, which occurs before the first complete negative half-cycle in the window 802. The sub-window 805 is a sub-window of the window 802 and thus the number of points of the positive half-cycle 804 is less than the 32 samples within the window 802.

Similarly: (i) within window 806, the amplitude extraction module 702 identifies a negative half-cycle 808 defined within sub-window 809 as the first complete negative half-cycle, which occurs before the first complete positive half-cycle in the window 806, and (ii) within window 810, the amplitude extraction module 702 identifies a positive half-cycle 812 within sub-window 813 as the first complete positive half-cycle, which occurs before the first complete negative half-cycle in the window 810, and so on. The amplitude extraction module 702 then sums (i.e., accumulates or integrates overtime) all the absolute data values for each positive half-cycle or negative half-cycle for the sine feedback signal 400 and the cosine feedback signal 402 (i.e., the modulated sine and cosine signals), respectively.

Figure 9:
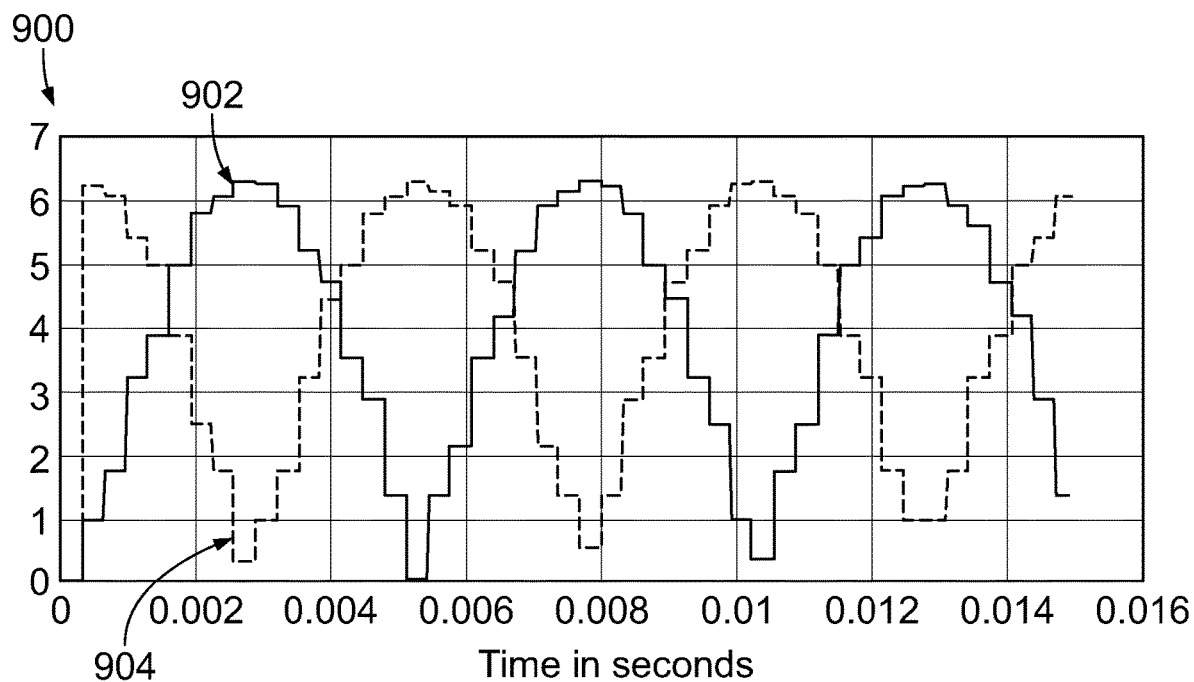
FIG. 9 illustrates a graph showing integrated values of positive or negative half-cycles for a sine feedback signal and a cosine feedback signal, in accordance with an example implementation.

FIG. 9 illustrates a graph 900 showing integrated values of positive or negative half-cycles for the sine feedback signal 400 and the cosine feedback signal 402, in accordance with an example implementation. Particularly, the graph 900 depicts a rectified sine signal 902 and a rectified cosine signal 904.

As shown, the rectified sine signal 902 and the rectified cosine signal 904 have steps, and each step represents a summation of values of data points composing a particular positive or negative half-cycle (e.g., the positive half-cycle 804 or the negative half-cycle 809) within a particular window of 32 samples (e.g., within the window 802 or the window 806).

This way, the amplitudes or values of the rectified sine signal 902 and the rectified cosine signal 904 are proportional the amplitudes of the sine feedback signal 400 and the cosine feedback signal 402, respectively. The signals in FIG. 9 are referred to as rectified because the values are all considered as positive values by taking the sum of the absolute value of each positive or negative half-cycle.

Advantageously, integrating or accumulation of values to generate the rectified sine signal 902 and the rectified cosine signal 904, rather than considering a peak of a signal for example, may have a noise filtering effect. This way, accuracy of determining the amplitude at a given point in time may be enhanced.

With these processes, the amplitude extraction module 702 eliminates the effect of the carrier frequency of the excitation signal 308 and generates the rectified sine signal 902 and the rectified cosine signal 904. The rectified sine signal 902 and the rectified cosine signal 904 represent sampled versions of rectified, demodulated sine and cosine signals generated by the resolver 200.

Referring back to FIG. 7, the rectified sine signal 902 and the rectified cosine signal 904 are provided from the amplitude extraction module 702 to the direction extraction module 704. The direction extraction module 704 also receives the modulated signals (i.e., the sine feedback signal 400 and the cosine feedback signal 402).

The direction extraction module 704 is configured to then use the rectified sine signal 902 and the rectified cosine signal 904 to determine the direction of rotation of the resolver rotor 204, which is the direction of rotation of the output shaft 106. In an example, the direction extraction module 704 first generates a logic signal indicating when the rectified cosine signal 904 exceeds the rectified sine signal 902. The logic signal assigns a zero value elsewhere.

Figure 10:
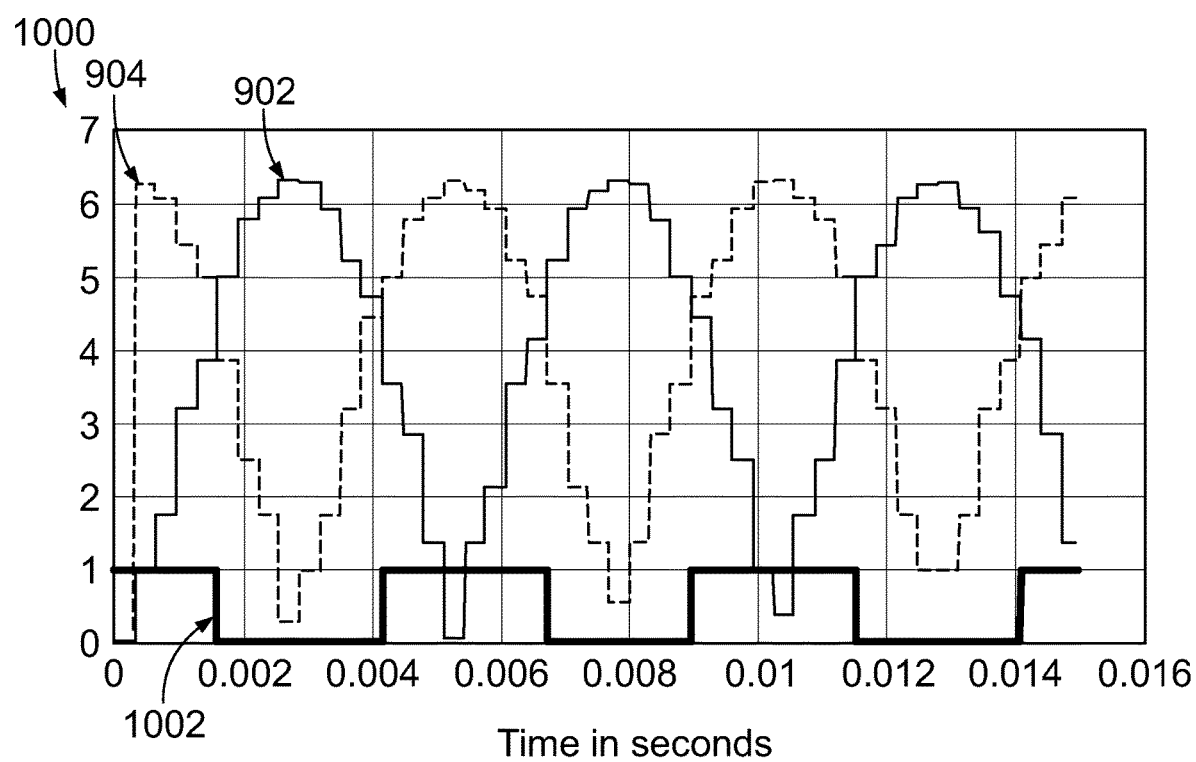
FIG. 10 illustrates a graph showing a first logic signal indicating when a rectified cosine signal exceeds a rectified sine signal, in accordance with an example implementation.

FIG. 10 illustrates a graph 1000 showing a first logic signal 1002 indicating when the rectified cosine signal 904 exceeds the rectified sine signal 902, in accordance with an example implementation. As shown, the first logic signal 1002 is a square wave having a value of 1 when the rectified cosine signal 904 exceeds the rectified sine signal 902 and a value of zero when the rectified sine signal 902 exceeds the rectified cosine signal 904.

The direction extraction module 704 then generates a second logic signal from the modulated sine and cosine resolver signals, i.e., from the sine feedback signal 400 and the cosine feedback signal 402. Particularly, this second logic signal is created from the product (i.e., multiplication) of the sine feedback signal 400 and the cosine feedback signal 402. If the product of the sine feedback signal 400 and the cosine feedback signal 402 is positive, the second logic signal has a value of 1. If the product of the sine feedback signal 400 and the cosine feedback signal 402 is negative, the second logic signal has a value of −1. This second logic signal is different depending on whether the resolver rotor 204 is rotating in a positive direction or a negative direction.

Figure 11:
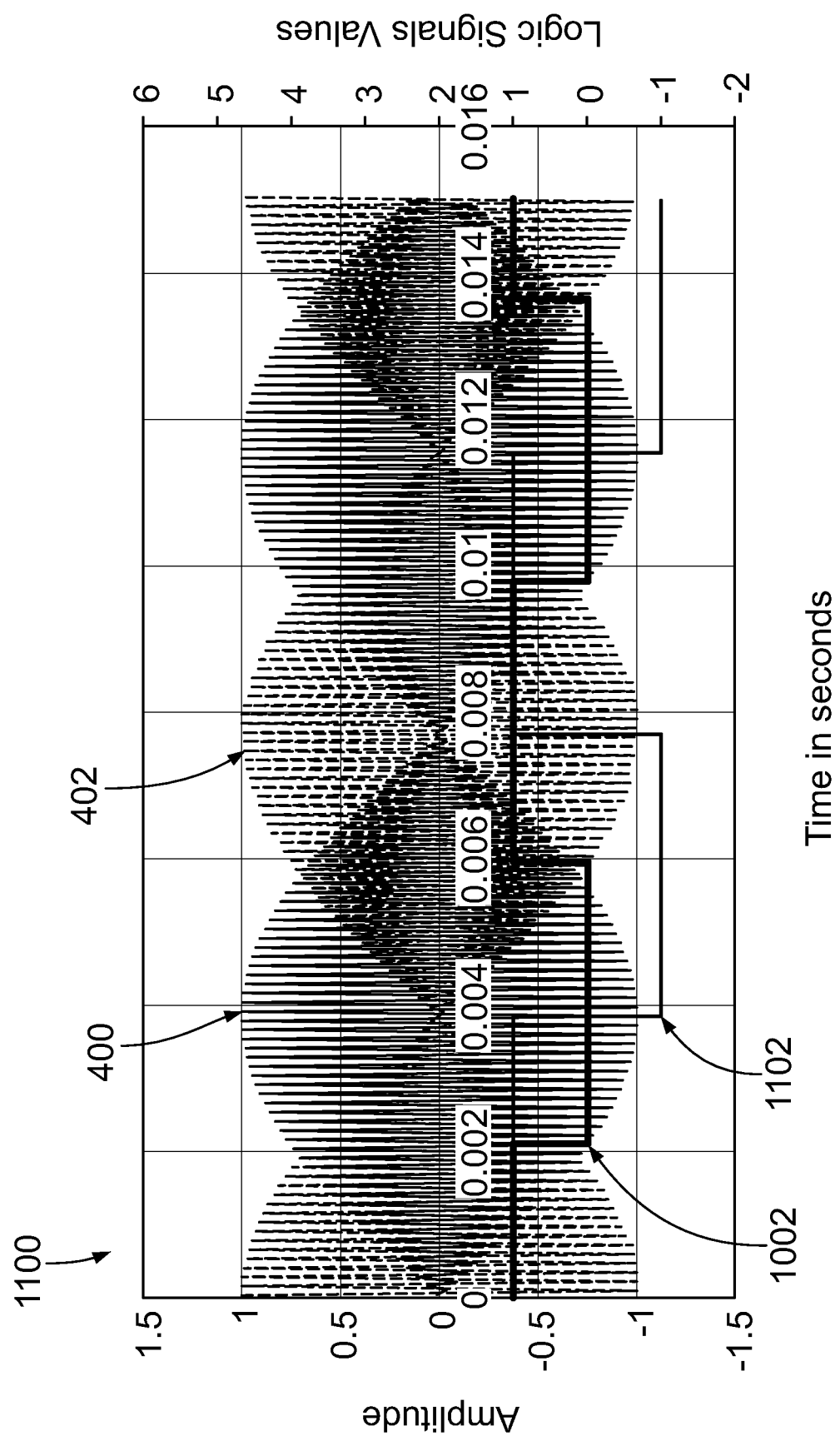
FIG. 11 illustrates a graph showing a sine feedback signal, a cosine feedback signal, a first logic signal 1002, and a second logic signal during positive rotation, in accordance with an example implementation.
Figure 12:
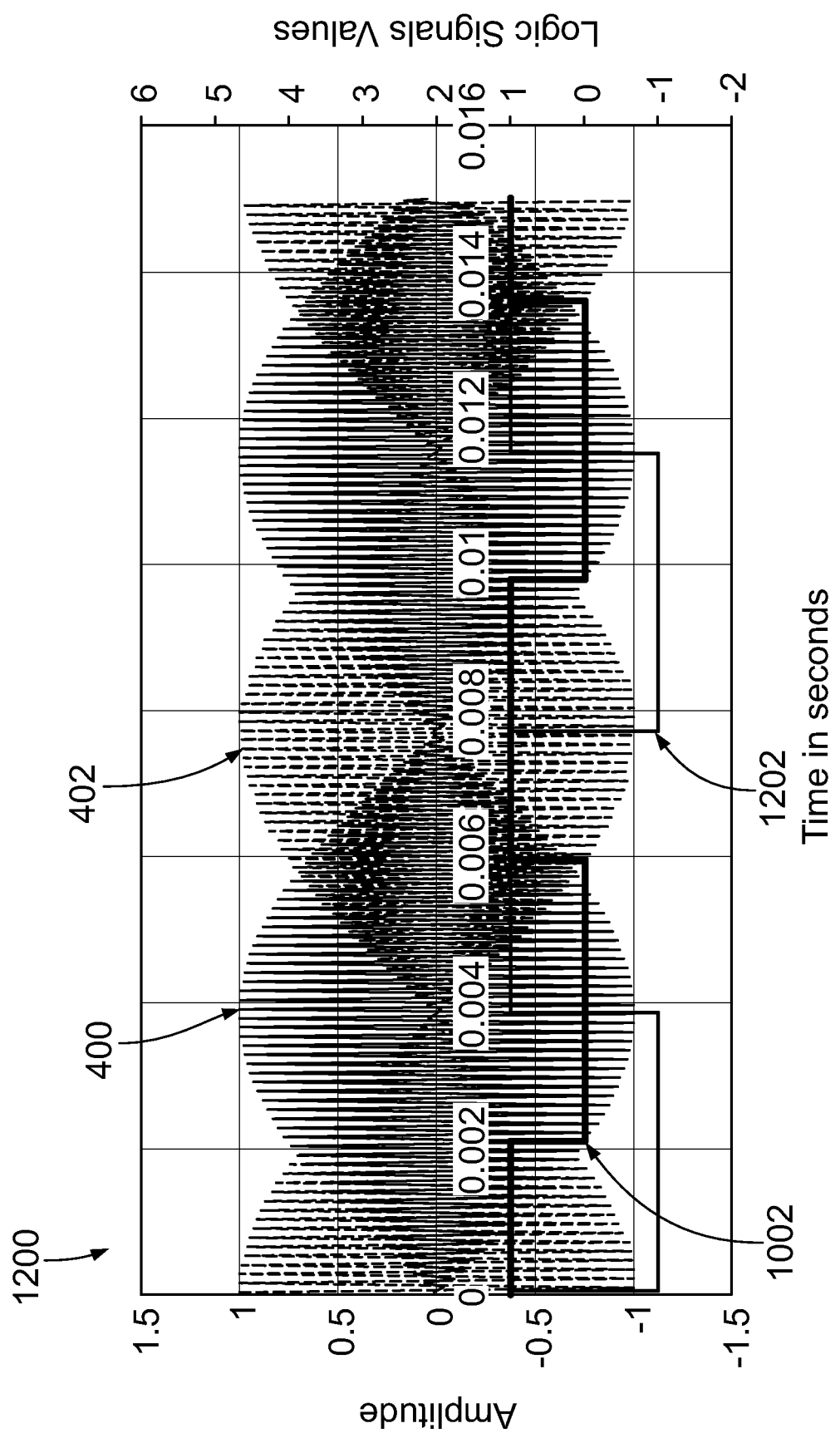
FIG. 12 illustrates a graph showing a sine feedback signal, a cosine feedback signal, a first logic signal, and a second logic signal during negative rotation, in accordance with an example implementation.

FIG. 11 illustrates a graph 1100 showing the sine feedback signal 400, the cosine feedback signal 402, the first logic signal 1002, and a second logic signal 1102 during positive rotation, and FIG. 12 illustrates a graph 1200 showing the sine feedback signal 400, the cosine feedback signal 402, the first logic signal 1002, and a second logic signal 1202 during negative rotation, in accordance with an example implementation.

The direction extraction module 704 determines the direction of rotation based on the value or level of the second logic signal and the signal edge of the first logic signal 1002. The signal edge is a transition of the first logic signal 1002 from low to high (rising edge) or from high to low (falling edge). "Low" means zero and "high" means 1 in this case.

For example, if at a falling edge of the first logic signal 1002, the second logic signal is positive, then the direction of rotation is positive (FIG. 11). If at a falling edge of the first logic signal 1002, the second logic signal is negative, then the direction of rotation is negative (FIG. 12). If at a rising edge of the first logic signal 1002, the second logic signal is negative, then the direction of rotation is positive (FIG. 11). If at rising edge of the first logic signal 1002, the second logic signal is positive, then the direction of rotation is negative (FIG. 12).

The product of the sine feedback signal 400 and the cosine feedback signal 402 changes every 45 degrees of rotation, i.e., every quarter of a cycle or rotation. As such, the direction extraction module 704 determines the direction of rotation of the resolver rotor 204 (and the output shaft 106) every quarter of a cycle.

Referring back to FIG. 7, the rectified sine signal 902 and the rectified cosine signal 904 and the resolver direction information extracted by the direction extraction module 704 are provided to the speed extraction module 706. The speed extraction module 706 then uses such signals and information associated with determining the direction of rotation (e.g., the first logic signal 1002 and the second logic signal 1102, 1202) to determine the rotational speed of the resolver rotor 204.

As an initial step, the speed extraction module 706 generates signed sine and cosine signals using the rectified sine signal 902, the rectified cosine signal 904, the first logic signal 1002, and the second logic signal (e.g., the second logic signal 1102 or the second logic signal 1202). The speed extraction module 706 first determines or assigns a "state" based on the values of the first logic signal 1002 and the second logic signal 1102, 1202. Table 1 illustrates a "state" value assigned based on particular values for the first logic signal 1002 and the second logic signal 1102, 1202.

TABLE 1

| sine and cosine signal toggle logic | | |
|---|---|---|
| First Logic Signal | Second Logic Signal | State |
| 0 | −1 | 0 |
| 1 | −1 | 1 |
| 1 | 1 | 2 |
| 0 | 1 | 3 |

Each state lasts for 45 degrees of rotation (i.e., quarter of a cycle of the sine feedback signal 400 and the cosine feedback signal 402). As such, a complete sequence of states 0, 1, 2, 3 represents 180 degrees of rotation. The values of the states in table 1 are chosen arbitrarily and other values or order can be used.

By moving through successive states, (0,1,2,3,0,1,2,3) for positive rotation or (3,2,1,0,3,2,1,0) for negative rotation, the speed extraction module 706 derives an additional "toggle" logic signal to distinguish between the first 180 degrees (i.e., the first half) and second 180 degrees (i.e., the second half) of the sine feedback signal 400 and the cosine feedback signal 402.

Figure 13:
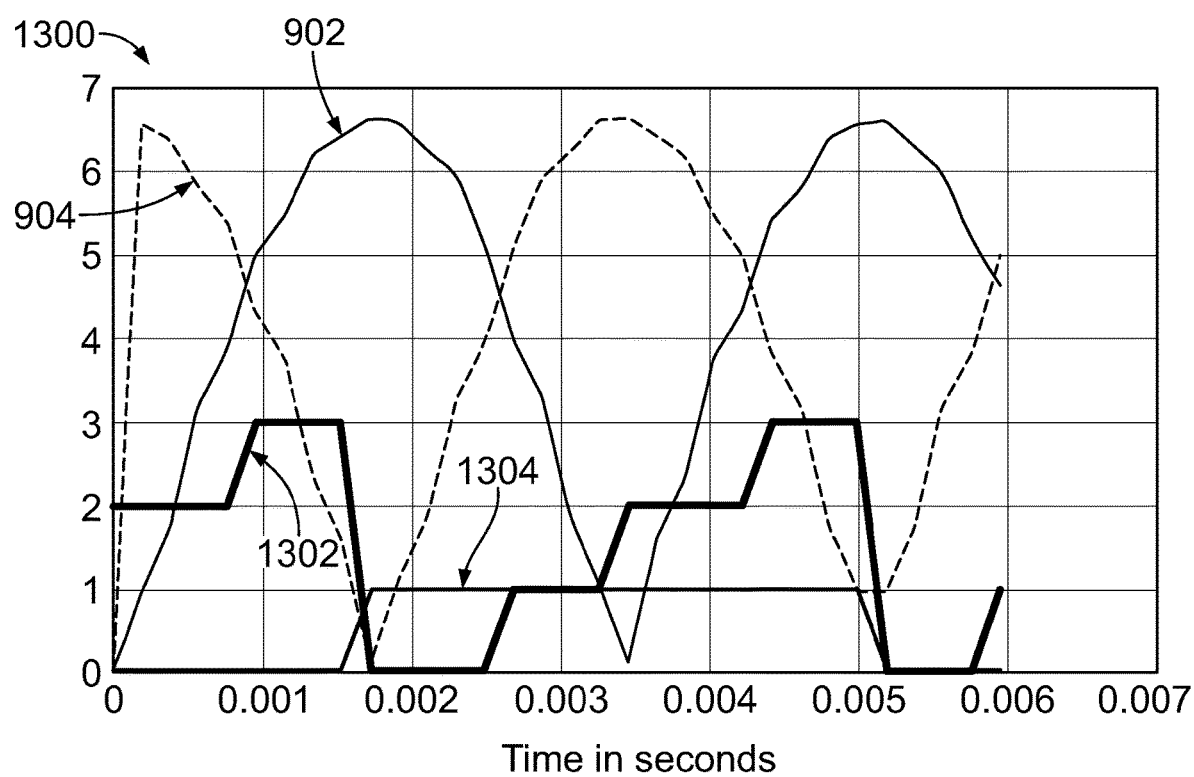
FIG. 13 a graph showing portions of a rectified sine signal and a rectified cosine signal with a state signal and toggle signal during positive rotation, in accordance with an example implementation.

FIG. 13 illustrates a graph 1300 showing portions of the rectified sine signal 902 and the rectified cosine signal 904 with a state signal 1302 and toggle signal 1304 during positive rotation, in accordance with an example implementation. The speed extraction module 706 uses the state signal 1302 and the toggle signal 1304 to determine a sine and cosine signal multiplier as shown in table 2.

TABLE 2

| Positive rotation sine and cosine multiplier derivation | | | |
|---|---|---|---|
| State | Toggle | Cosine Multiplier | Sine Multiplier |
| 0 | 0 | +1 | −1 |
| 1 | 0 | +1 | −1 |
| 2 | 0 | +1 | +1 |
| 3 | 0 | +1 | +1 |
| 0 | 1 | −1 | +1 |
| 1 | 1 | −1 | +1 |
| 2 | 1 | −1 | −1 |
| 3 | 1 | −1 | −1 |

Figure 14:
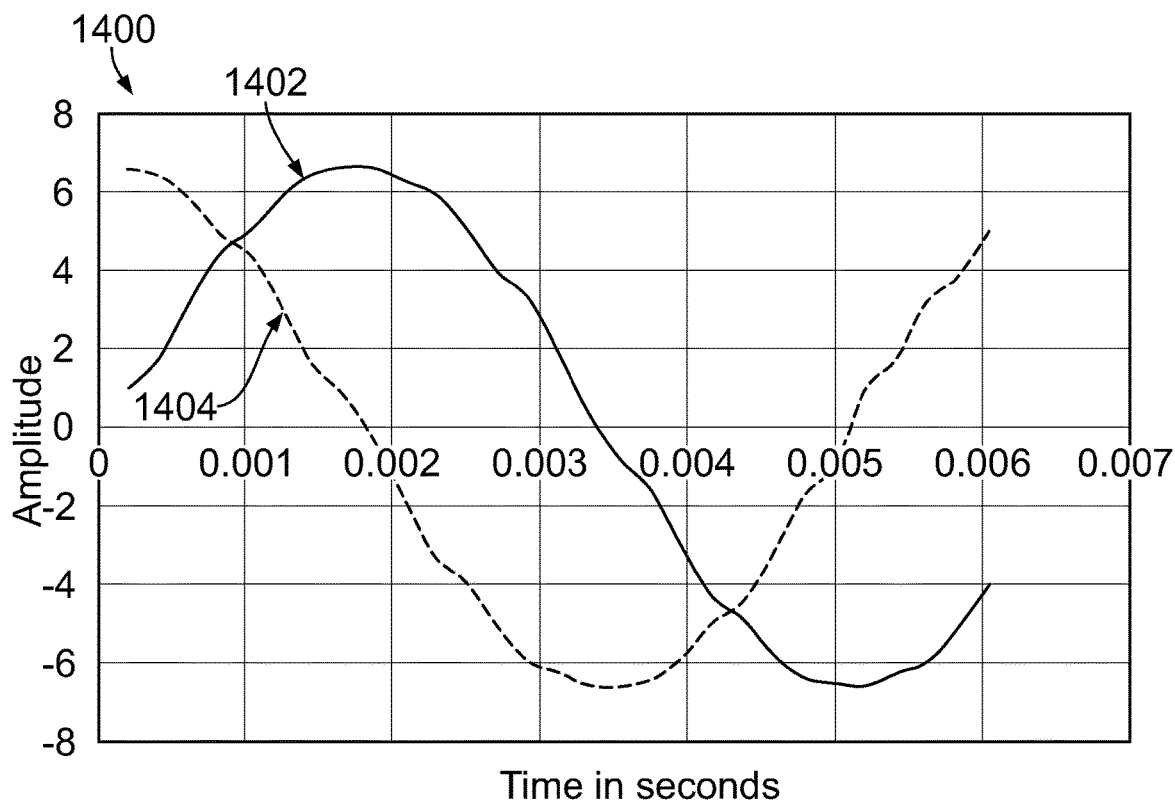
FIG. 14 a graph showing reconstructed, signed sine signal and signed cosine signal, in accordance with an example implementation.

The speed extraction module 706 then uses the sine and cosine signal multipliers to reconstruct the full signed sine and cosine signals. For example, the speed extraction module 706 multiplies the rectified sine signal 902 and the rectified cosine signal 904 by the appropriate sine and cosine signal multipliers based on Table 2. FIG. 14 illustrates a graph 1400 showing reconstructed, signed sine signal 1402 and signed cosine signal 1404, in accordance with an example implementation.

Figure 15:
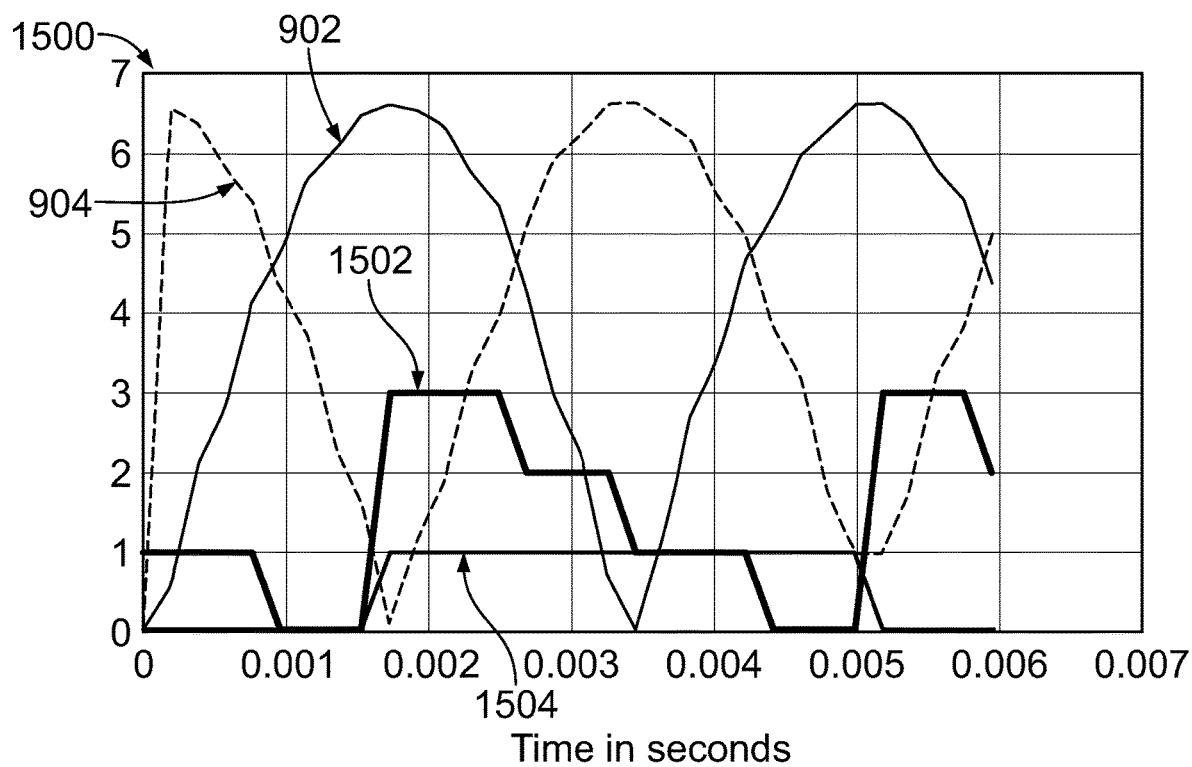
FIG. 15 a graph showing portions of a rectified sine signal and a rectified cosine signal with a state signal and toggle signal during negative rotation, in accordance with an example implementation.

On the other hand, during negative rotation, the assigned successive states move through the sequence (3,2,1,0,3,2,1,0). FIG. 15 illustrates a graph 1500 showing portions of the rectified sine signal 902 and the rectified cosine signal 904 with state signal 1502 and toggle signal 1504 during negative rotation, in accordance with an example implementation. The speed extraction module 706 uses the state signal 1502 and the toggle signal 1504 to determine a sine and cosine signal multiplier as shown in table 3.

TABLE 3

| Negative rotation sine and cosine multiplier derivation | | | |
|---|---|---|---|
| State | Toggle | Cosine Multiplier | Sine Multiplier |
| 3 | 1 | −1 | −1 |
| 2 | 1 | −1 | −1 |
| 1 | 1 | −1 | +1 |
| 0 | 1 | −1 | +1 |
| 3 | 0 | +1 | +1 |
| 2 | 0 | +1 | +1 |
| 1 | 0 | +1 | −1 |
| 0 | 0 | +1 | −1 |

Figure 16:
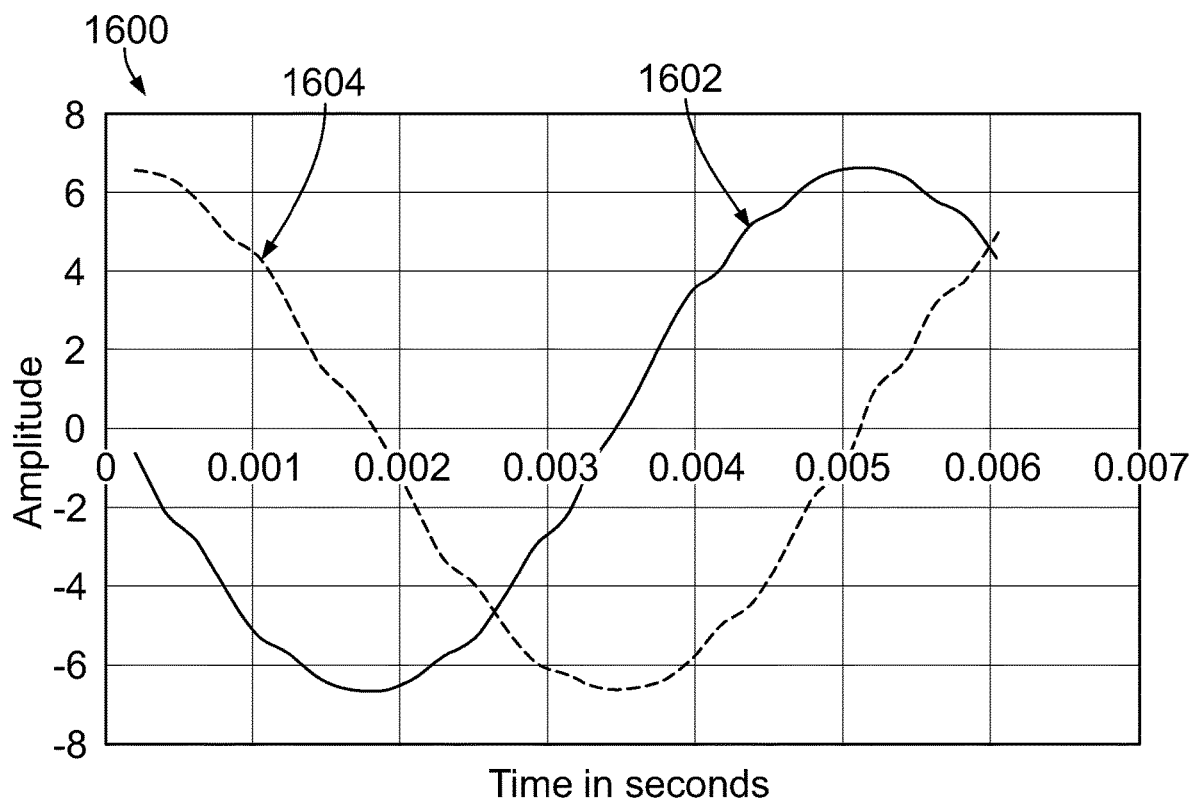
FIG. 16 a graph showing reconstructed, signed sine signal and signed cosine signal, in accordance with an example implementation.

The speed extraction module 706 then uses the sine and cosine signal multipliers of table 3 to reconstruct the full signed sine and cosine signals. FIG. 16 illustrates a graph 1600 showing reconstructed, signed sine signal 1602 and signed cosine signal 1604, in accordance with an example implementation.

Notably, the reconstructed, signed signals illustrated in FIGS. 14 and 16 are not phase-aligned with the sine feedback signal 400 and the cosine feedback signal 402, and therefore might not be used to determine rotary position of the resolver rotor 204. However, the speed and direction derived are accurate as they do not depend on phases being aligned.

In examples, the speed extraction module 706 further includes a tracking phase-locked loop (PLL) and a low-pass filter (LPF). In this example, the speed extraction module 706 filters or passes the signed sine signals 1402, 1602 and the signed cosine signals 1404, 1604 through the LPF to smoothen them (i.e., reduce signal noise). The LPF break frequency can be chosen such as not to add substantial phase delay at the maximum resolver rotation speed. As an example for illustration, the LPF break frequency can be set at 250 Hz.

Figure 17:
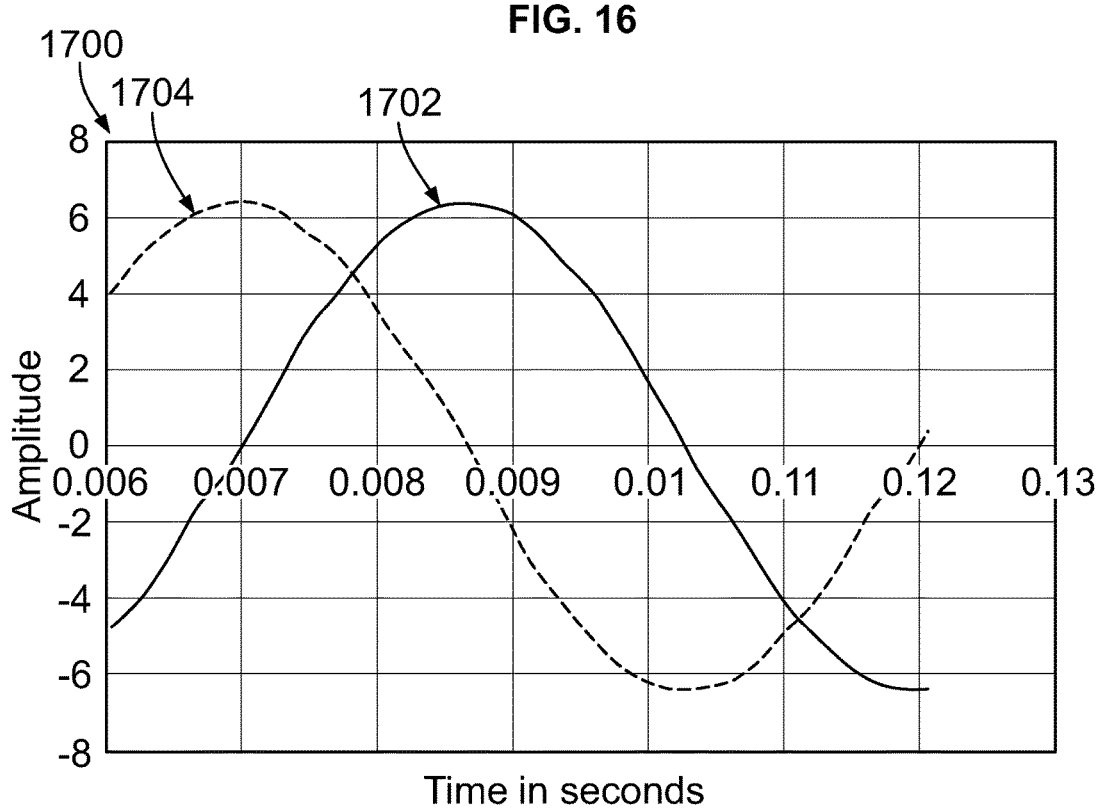
FIG. 17 a graph showing output signals of a low-pass filter of a speed extraction module, in accordance with an example implementation.

FIG. 17 illustrates a graph 1700 showing output signals of a LPF of the speed extraction module 706, in accordance with an example implementation. Particularly, FIG. 17 depicts a filtered sine signal 1702 and a filtered cosine signal 1704 resulting from the LPF.

In an example, the speed extraction module 706 further processes the filtered sine signal 1702 and the filtered cosine signal 1704 through a tracking phase-locked loop (PLL). The PLL is configured to generate a speed signal indicating the rotational speed of the resolver rotor 204, where a phase of the speed signal is related to the phase of the input sine and cosine signals provided by the LPF, and the PLL also has a filtering effect that further smoothens the speed signal.

Figure 18:
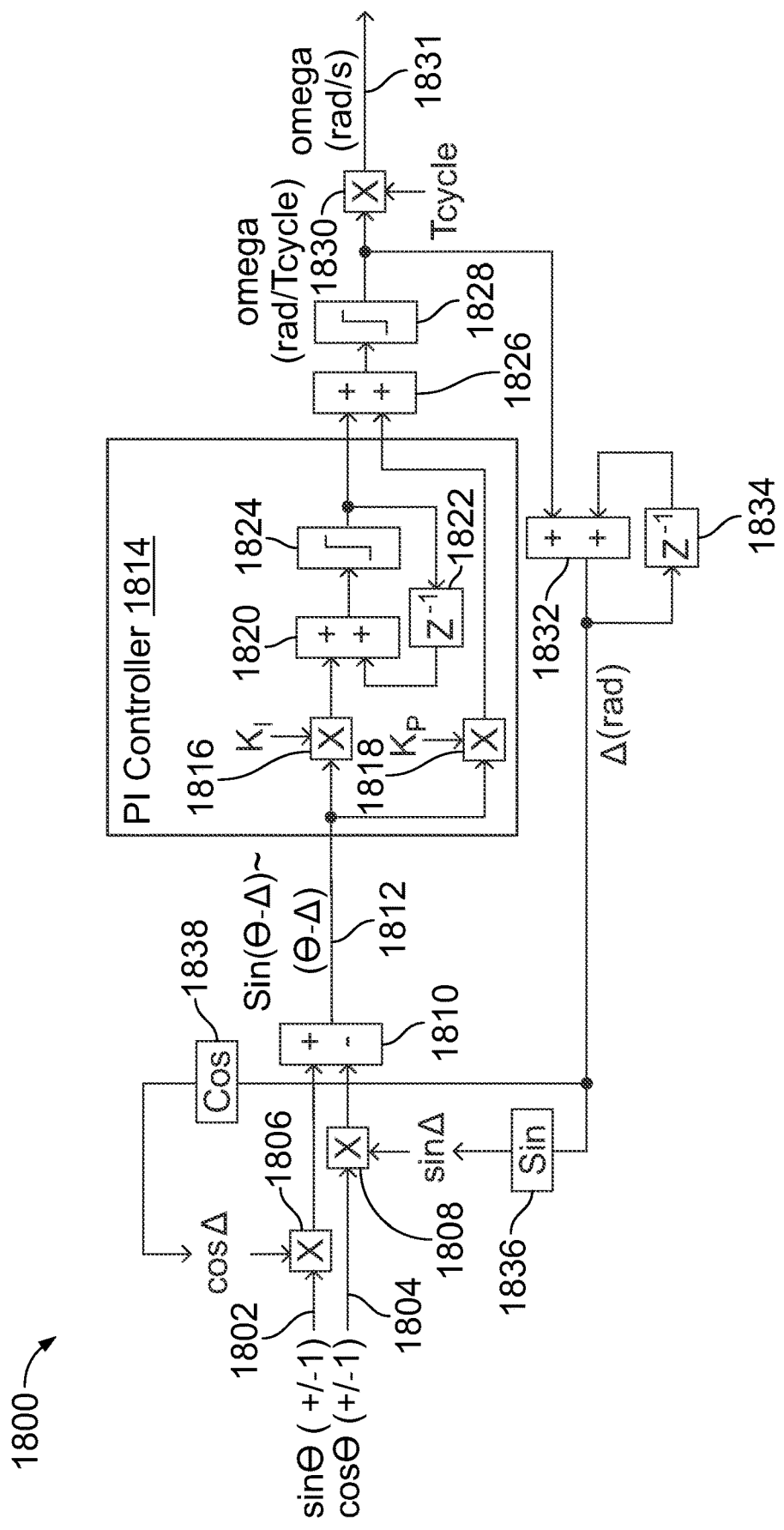
FIG. 18 illustrates a block diagram of a tracking phase-locked loop, in accordance with an example implementation.

FIG. 18 illustrates a block diagram of a tracking PLL 1800, in accordance with an example implementation. The PLL 1800 receives a filtered sine signal 1802 and a filtered cosine signal 1804 from the LPF (the filtered sine signal 1802 and the filtered cosine signal 1804 represent the filtered sine signal 1702 and the filtered cosine signal 1704, for example). The filtered sine signal 1802 is multiplied at multiplication block 1806 by (Cos Δ), which is a cosine of a change "Δ" in angle of rotation determined as described below. The filtered cosine signal 1804 is multiplied at multiplication block 1808 by (Sin Δ), which is a sine of the change "Δ" in angle of rotation.

The output of the multiplication block 1808 is subtracted from the output of the multiplication block 1806 at difference block 1810. Due to the properties of the sine and cosine functions, the output of the difference block 1810 is Sin (θ−Δ). Further, Sin (θ−Δ) is approximately equal to (θ−Δ) when (θ−Δ) is a small value. Thus, the output of the difference block 1810 can be considered as (θ−Δ). The difference (θ−Δ) is provided as an error signal 1812 to a proportional-integral (PI) closed-loop feedback controller, PI controller 1814.

The error signal 1812 is multiplied by an integral gain $K_I$ at multiplication block 1816 and multiplied by a proportional gain $K_P$ at multiplication block 1818. The output of the multiplication block 1816 is added at summation block 1820 to an output of a unit delay block 1822 (i.e., a $z^{-1}$ discrete-time operator). The unit delay block 1822 holds and delays its input by the sampling period (Tcycle). Thus, the unit delay block 1822 holds and delays its input by one iteration. As such, the output of the summation block 1820 amounts to an integration of the error signal 1812 over time.

The output of the summation block 1820 is passed to a saturation block 1824. The saturation block 1824 produces an output signal that is the value of the input signal bounded to upper and lower saturation values.

The output of the saturation block 1824 is added to the output of the multiplication block 1818 at summation block 1826. The output of summation block 1826 is rotational speed in radians/sampling period (rad/Tcycle). The tracking PLL 1800 can have another saturation block 1828 to limit the rotational speed output signal to a value bounded to upper and lower saturation values. The output of the saturation block 1828 is then multiplied by the sampling period Tcycle at multiplication block 1830 to produce speed signal 1831 indicating rotational speed (Ω) of the resolver rotor 204 and the output shaft 106 of the electric motor 100 in radians/second (rad/s).

The output of the saturation block 1828 is also provided to summation block 1832, where it is added to an output of another unit delay block 1834, the input to which is the output of the summation block 1832. Thus, the output of the summation block 1832 is effectively an integration of the output of the saturation block 1828, which is the rotational speed in rad/Tcycle. As such, the output of the summation block 1832 is the change "Δ" in the angle of rotation of the resolver rotor 204 and the output shaft 106 in radians.

The angular change "Δ" is then provided to Sin block 1836 and Cos block 1838 to calculate (Sin Δ) and (Cos Δ), respectively. As described above, the filtered sine signal 1802 is multiplied at multiplication block 1806 by (Cos Δ) and the filtered cosine signal 1804 is multiplied at multiplication block 1808 by (Sin Δ).

Thus, the direction extraction module 704 generates information indicative of direction of rotation of the resolver rotor 204 and the output shaft 106 of the electric motor 100, and the speed extraction module 706 generates information indicative of the rotational speed Ω of the resolver rotor 204 and the output shaft 106 of the electric motor 100. The sensor signal processing module 528 further includes a resolver speed monitor and a resolver direction monitor that compare this direction and speed information output by the direction extraction module 704 and the speed extraction module 706 to the direction and speed generated by the resolver-to-digital converter 502 to monitor direction and speed of the electric motor 100 and ensure accuracy of the speed and direction information.

Figure 19:
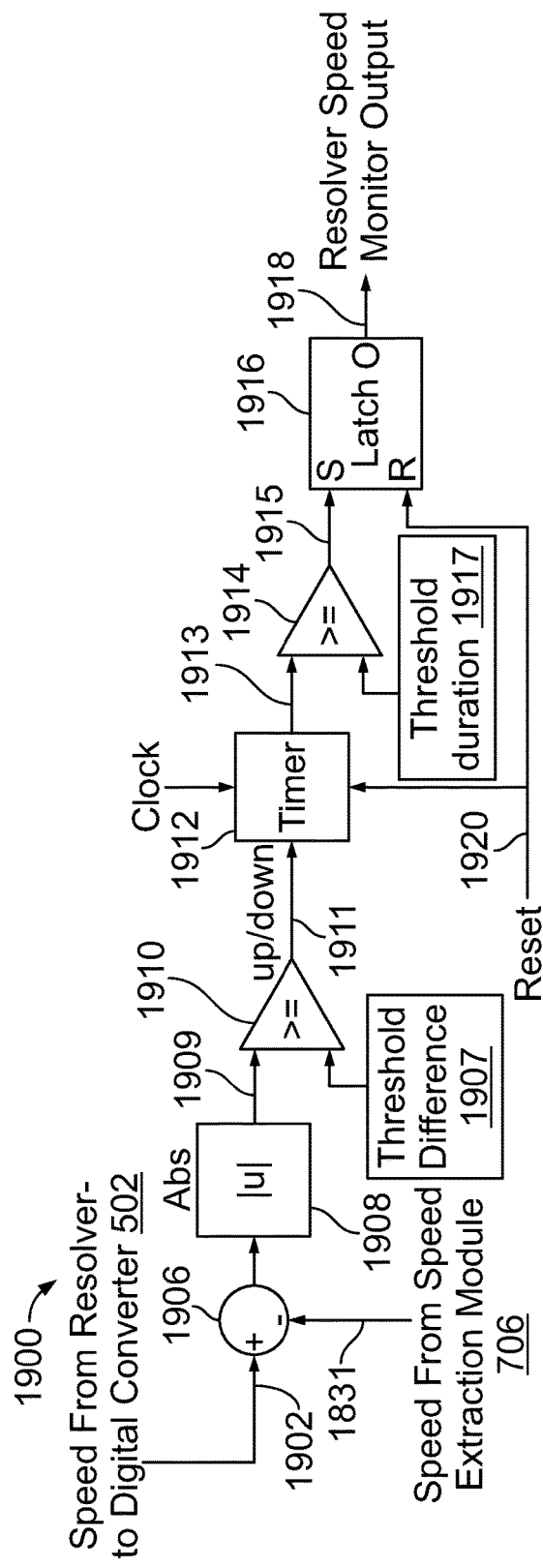
FIG. 19 a block diagram of a resolver speed monitor, in accordance with an example implementation.

FIG. 19 illustrates a block diagram of a resolver speed monitor 1900, in accordance with an example implementation. At difference block 1906, speed signal 1902 generated by the resolver-to-digital converter 502 is compared to speed signal 1831, which is the estimated speed generated by the speed extraction module 706. An absolute value of the difference generated by the difference block 1906 (i.e., the modulus of the difference generated by the difference block 1906, which is the non-negative value of the difference without regard to its sign) is then determined at absolute value block 1908.

Output signal 1909 of the absolute value block 1908 is then provided as an input to a comparator 1910, which compares the difference generated by the absolute value block 1908 to a threshold difference 1907 (i.e., a predetermined difference value such as a 10% difference). If the output signal 1909 meets the threshold difference 1907 (e.g., if the threshold difference 1907 is greater than or equal to the threshold difference 1907), the comparator 1910 sends a signal 1911 (e.g., a trigger value of 1) to a timer block 1912 to start a timer. If the output signal 1909 does not meet the threshold difference 1907 (e.g., is less than the threshold difference 1907), the comparator 1910 does not trigger the timer block 1912 to start the timer (e.g., sends a value of 0 that does not trigger the timer block 1912).

A timer output 1913 is provided by the timer block 1912 to a comparator 1914, which compares the timer output 1913 to a threshold duration 1917 (i.e., a threshold period of time such as 5 milliseconds). The comparator 1914 then sends a set signal 1915 to a latch block 1916.

If the value of the output signal 1909 remains less than the threshold difference 1907 or if the output signal 1909 remains greater than the threshold difference 1907 for a duration less than the threshold duration 1917 (i.e., the output signal 1909 goes back to being less than the threshold difference 1907 before the timer reaches the threshold duration 1917), the set signal 1915 can have a particular value (e.g., a value of zero). In response to that particular value for the set signal 1915, the latch block 1916 outputs a resolver speed monitor output signal 1918 that indicates that the speed output by the resolver-to-digital converter 502 is accurate and can be relied on in controlling the electric motor 100.

On the other hand, if the value of the output signal 1909 remains greater than the threshold difference 1907 for a period of time that exceeds the threshold duration 1917, the comparator 1914 sends the set signal 1915 having a different value (e.g., a value of 1). In this case, the set signal 1915 causes the latch block 1916 to output the resolver speed monitor output signal 1918 indicating that the speed output by the resolver-to-digital converter 502 might not be relied on in controlling the electric motor 100. The motor controller 504 can then operate the electric motor 100 in a safe mode or limited-performance mode. The resolver speed monitor 1900 can reset the latch block 1916 via a reset signal 1920 once any discrepancy in speeds is resolved.

As such, the speed signal 1831 derived by the speed extraction module 706 is compared with the speed signal provided by the resolver-to-digital converter 502, and a difference is calculated between the two signals. If the difference exceeds a pre-determined acceptable level for a duration greater than pre-determined period of time, an error signal is produced for the motor controller 504 to act upon (to either reduce system performance or operate in a safe state).

Additionally, the sensor signal processing module 528 monitors the direction of rotation of the resolver rotor 204. The sensor signal processing module 528 then provides a signal indicative of whether the direction determined by the resolver-to-digital converter 502 can be relied on.

Figure 20:
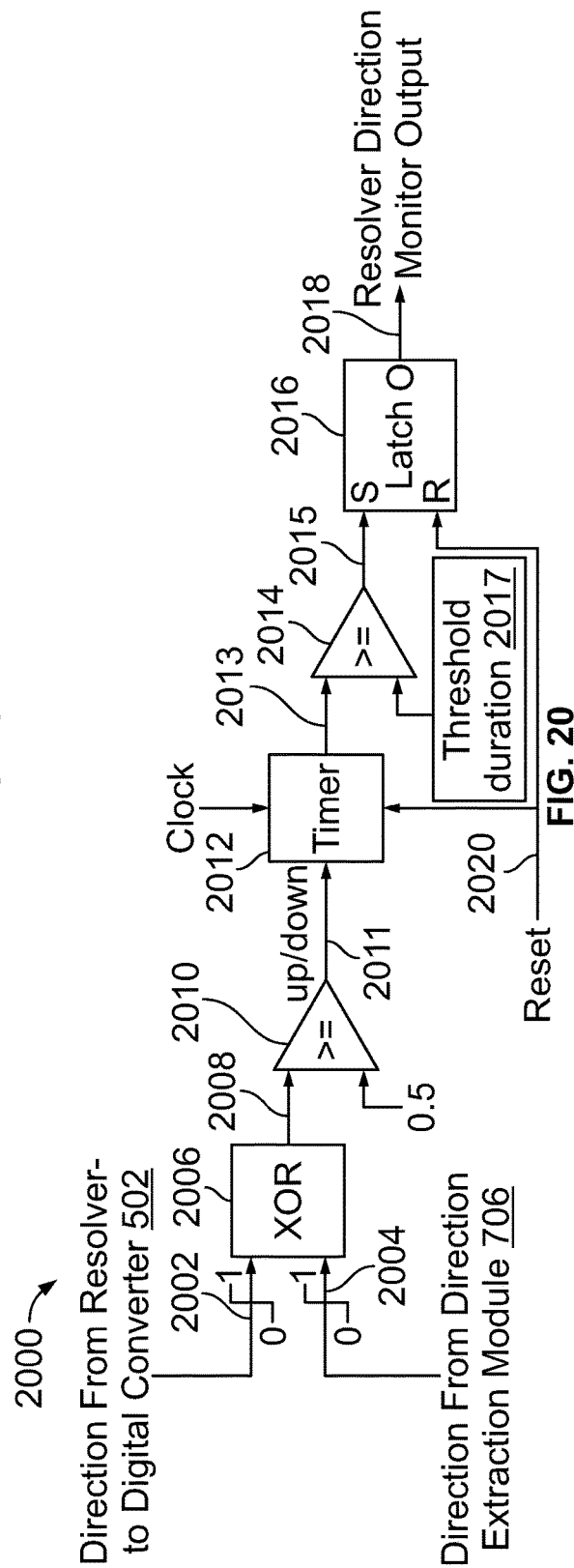
FIG. 20 a block diagram of a resolver direction monitor 2000, in accordance with an example implementation.

FIG. 20 illustrates a block diagram of a resolver direction monitor 2000, in accordance with an example implementation. Direction signal generated by the resolver-to-digital converter 502 is converted to a converted direction signal 2002 having a value that is either zero or 1. For instance, for positive rotation, the value is 1 and for negative rotation the value is zero. Similarly, a direction signal indicating the estimated direction generated by the direction extraction module 704 is also converted to converted direction signal 2004 having a value that is either zero or 1. Other values can be used, such as −1 and 1.

The converted direction signals 2002, 2004 are then provided to an exclusive "OR" (XOR) block 2006. The XOR block 2006 is configured to provide an output signal 2008 that has a value of 1 only if the converted direction signal 2002 from the resolver-to-digital converter 502 is different from the converted direction signal 2004 from the direction extraction module 704. If both signals agree, the XOR block 2006 outputs a value of zero. Thus, if the direction estimated by both the resolver-to-digital converter 502 and the direction extraction module 704 match, the XOR block 2006 outputs a value of zero; if they do not match, the XOR block 2006 outputs a value of 1.

The output signal 2008 of the XOR block 2006 is provided to a comparator 2010, which compares the output signal 2008 to a value of 0.5 (or any other threshold value between zero and 1). If the output signal 2008 is greater than 0.5, the comparator 2010 sends a signal 2011 (e.g., a trigger value of 1) to a timer block 2012 to start a timer. If the output signal 2008 is less than 0.5, the comparator 2010 does not trigger the timer block 2012 to start the timer (e.g., sends a value of 0 that does not trigger the timer block 2012).

A timer output 2013 is provided by the timer block 2012 to a comparator 2014, which compares the timer output 2013 to a threshold duration 2017 (i.e., a threshold period of time such as 5 milliseconds). The comparator 2014 then sends a set signal 2015 to a latch block 2016.

If the value of the output signal 2008 remains less than 0.5 or if the output signal 2008 is greater than 0.5 for a duration less than the threshold duration 2017, the set signal 2015 can have a particular value (e.g., a value of zero), and the latch block 2016 outputs a resolver direction monitor output signal 2018 that indicates that the direction output by the resolver-to-digital converter 502 is accurate and can be relied on in controlling the electric motor 100.

On the other hand, if the value of the output signal 2008 remains greater than 0.5 for a period of time that is greater than the threshold duration 2017, the comparator 2014 sends the set signal 2015 having a different value (e.g., a value of 1). In this case, the set signal 2015 causes the latch block 2016 to output the resolver direction monitor output signal 2018 indicating that the direction output by the resolver-to-digital converter 502 might not be relied on in controlling the electric motor 100. The motor controller 504 can then operate the electric motor 100 in a safe mode or limited-performance mode. The resolver direction monitor 2000 can reset the latch block 2016 via a reset signal 2020 once any discrepancy in direction is resolved.

As such, the resolver direction signal derived by the direction extraction module 704 is compared to the direction signal provided by the resolver-to-digital converter 502. If the two direction signals do not agree for a duration greater than pre-determined period of time, an error signal is produced for the motor controller 504 to act upon (to either reduce system performance or operate in a safe state).

In examples, in addition or alternative to monitoring speed and direction signals, the motor controller 504, and particularly the sensor signal processing module 528, can perform signal integrity checking operations at different stages of signal processing to evaluate integrity of the signals. The term "integrity" is used herein to indicate a measure of quality of the signal that renders the signal reliable. If any of the signal integrity checks fail, an error signal is produced for the motor controller 504 to act upon (to either reduce system performance or operate in a safe state).

Referring back to FIG. 7, the first three signal integrity checks can be performed on the raw sine and cosine buffer data of the sine data buffer 512 and cosine data buffer 514. The fourth signal integrity check is performed on the signals output by the amplitude extraction module 702, and the fifth signal integrity check is performed on the signals output by the direction extraction module 704.

Particularly, the first check aims to ensure that the sine feedback signal 400 and the cosine feedback signal 402 (i.e., the resolver modulated sine and cosine signals) are changing between windows of buffer data. For example, the sensor signal processing module 528 checks whether:

$$\text{Cos}(x)(n) \neq \text{Cos}(x)(n-1) \neq \text{Cos}(x)(n-2)$$

$$\text{Cos}(y)(n) \neq \text{Cos}(y)(n-1) \neq \text{Cos}(y)(n-2)$$

$$\text{Sin}(x)(n) \neq \text{Sin}(x)(n-1) \neq \text{Sin}(x)(n-2)$$

$$\text{Sin}(y)(n) \neq \text{Sin}(y)(n-1) \neq \text{Sin}(y)(n-2)$$

Where $$x = \frac{1}{4} \text{Buffer\_Length} + 1; \text{ and } y = \frac{3}{4} \text{Buffer\_Length} + 1, \sin(x) \text{ or } \cos(x)$$

represents the $x^{th}$ data element in the data buffer, (n) represents the present data buffer, (n−1) represents the previous data buffer, (n−2) represents the data buffer before the previous data buffer, and Buffer_Length is the length of the data buffers (e.g., 32, 64 or 128 elements). For example, if the buffer length of the sine data buffer 512 and the cosine data buffer 514 is 32 samples, then x=9 and y=25. In other examples, the sensor signal processing module 528 can also perform these checks at ½ the buffer length in addition to ¼ and ¾.

Thus, the sensor signal processing module 528 checks whether the sine and cosine values at particular sample locations (i.e., whether particular data points) within a given sine data buffer or cosine data buffer changed in value compared to respective data points in the two previous data buffers. Change in the values indicates that the signal may be reliable and realistic, and passes the first check.

The second check aims to ensure that the sine feedback signal 400 and the cosine feedback signal 402 (i.e., the resolver modulated sine and cosine signals) do not exceed an allowed maximum or minimum values. For example, the sensor signal processing module 528 can identify or extract from the sine data buffer 512 the maximum sine value in the sine feedback signal 400, "Max Sin", and also identify or extract the minimum sine value in the sine feedback signal 400, "Min Sin." The sensor signal processing module 528 then checks whether the magnitudes of Max Sin and Min Sin are less than a threshold amplitude (e.g., an allowed value), AMPLMax:

|Min Sin|<AMPLMax

|Max Sin|<AMPLMax

If so, then the sine feedback signal 400 is reliable.

Similarly, the sensor signal processing module 528 can identify or extract from the cosine data buffer 514 the maximum cosine value in the cosine feedback signal 402, "Max Cos", and also identify or extract the minimum cosine value in the cosine feedback signal 402, "Min Cos." The sensor signal processing module 528 then checks whether the magnitudes of Max Cos and Min Cos are less than a threshold amplitude, AMPLMax

|Min Cos|<AMPLMax

|Max Cos|<AMPLMax

If so, then the cosine feedback signal 402 is reliable.

The third check aims to ensure that the sine feedback signal 400 and the cosine feedback signal 402 (i.e., the resolver modulated sine and cosine signals) do not exceed an allowed offset. For example, the sensor signal processing module 528 checks whether the magnitude of the difference between maximum and minimum sin and cosine data values, are less than a maximum allowed value DCMax:

|Max Sin − Min Sin| < DC Max

|Max Cos − Min Cos| < DC Max

The sensor signal processing module 528 performs the fourth signal integrity check once the sine and cosine amplitude signals have been extracted at the amplitude extraction module 702. In other words, the sensor signal processing module 528 performs the fourth signal integrity check on the rectified sine signal 902 and the rectified cosine signal 904 (with the excitation carrier frequency removed).

With the fourth signal integrity check, the sensor signal processing module 528 aims to ensure that the vector magnitude of the rectified sine signal 902 and the rectified cosine signal 904 remains within limits:

$$\text{Min} < \left(\text{rectified sine signal}^2 + \text{rectified cosine signal}^2\right) < \text{Max}$$

Figure 21:
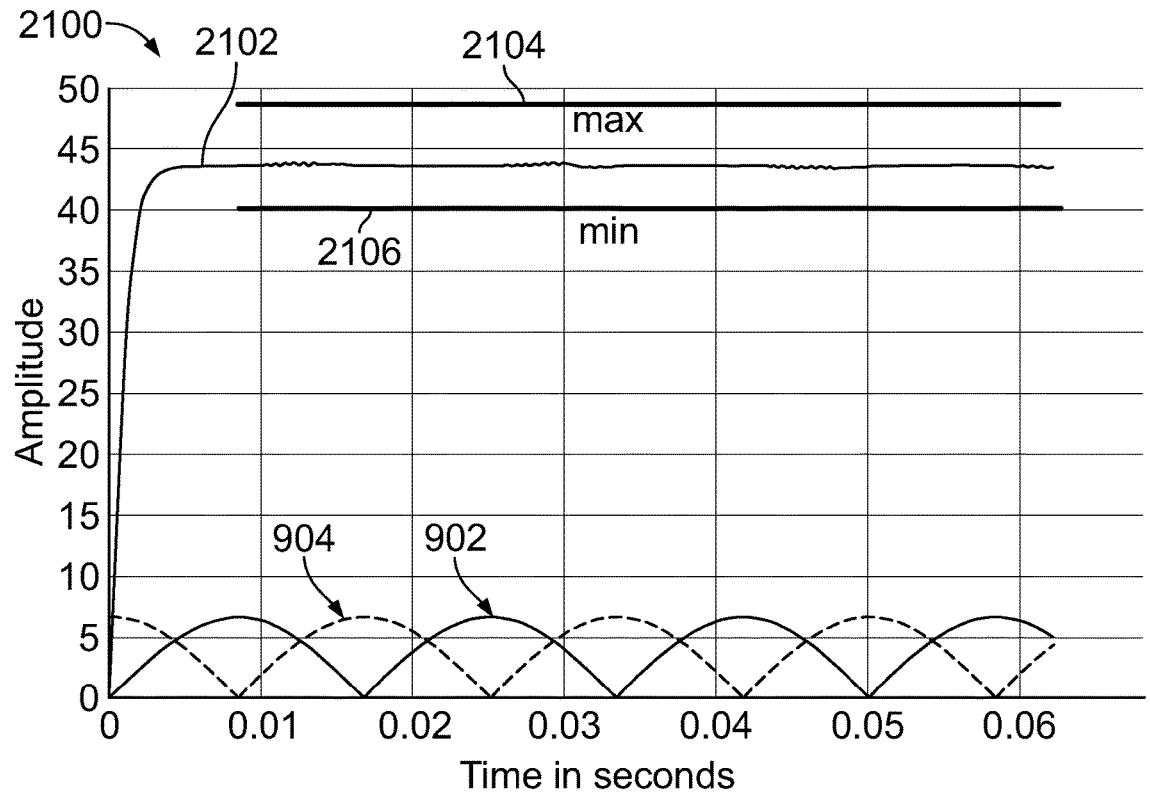
FIG. 21 illustrates a graph showing a sum of squares of a rectified sine signal and a rectified cosine signal remaining between particular maximum limit and minimum limit, in accordance with an example implementation.

Thus, the sensor signal processing module 528 determines the sum of the squares of the rectified sine signal 902 and the rectified cosine signal 904 and checks to ensure that the sum of the squares is constrained between an allowed maximum value and an allowed minimum value. FIG. 21 illustrates a graph 2100 showing a sum 2102 of squares of the rectified sine signal 902 and the rectified cosine signal 904 remaining between particular maximum limit 2104 and minimum limit 2106, in accordance with an example implementation.

This indicates that the signals are reliable. If the sum 2102 does not remain between the maximum limit 2104 and the minimum limit 2106, this fourth check fails.

The sensor signal processing module 528 performs the fifth signal integrity check once the sine and cosine direction (reconstructed, un-rectified) signals have been extracted at the direction extraction module 704. In other words, the sensor signal processing module 528 performs the fifth signal integrity check on the signed sine signal 1402 and the signed cosine signal 1404.

With the fifth signal integrity check, the sensor signal processing module 528 aims to ensure that the vector magnitude of the signed sine signal 1402 and the signed cosine signal 1404 remains within or is constrained between maximum and minimum values or limits:

$$\text{Min} < \left(\text{signed sine signal}^2 + \text{signed cosine signal}^2\right) < \text{Max}$$

Figure 22:
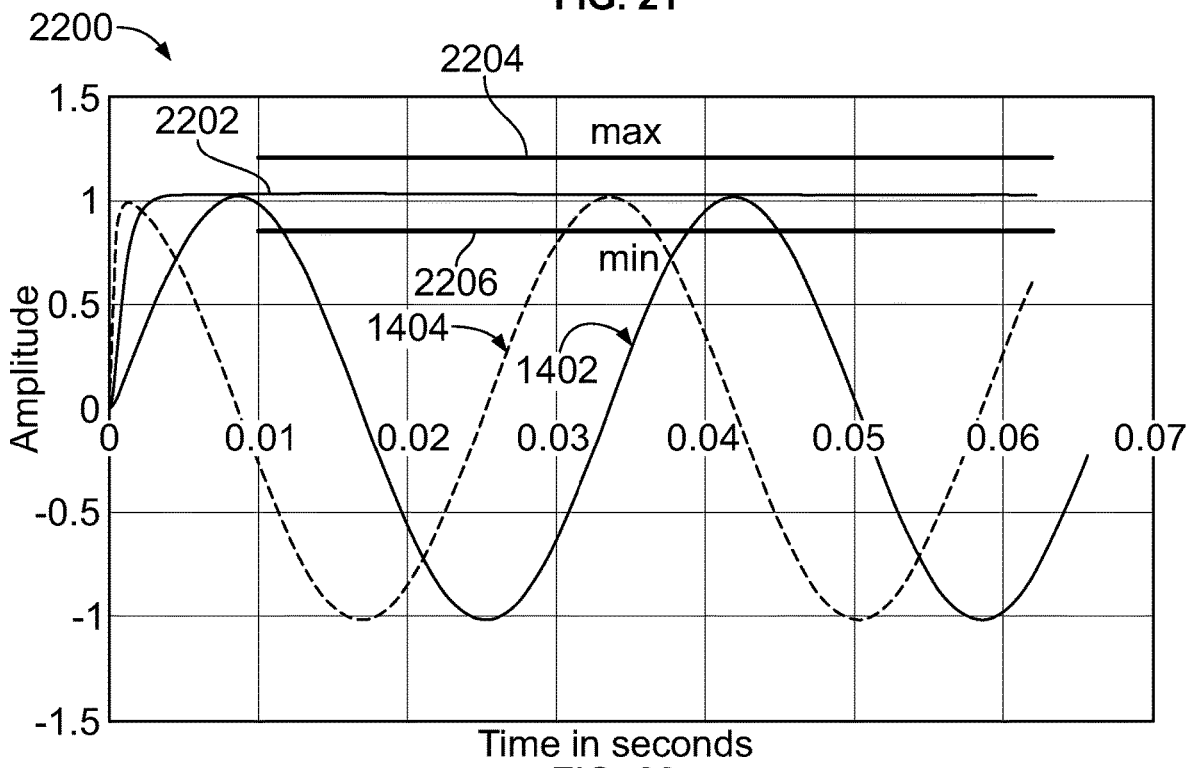
FIG. 22 illustrates a graph showing a sum of squares of a signed sine signal and a signed cosine signal remaining between particular maximum limit and minimum limit, in accordance with an example implementation.

Thus, the sensor signal processing module 528 determines the sum of the squares of the signed sine signal 1402 and the signed cosine signal 1404 and checks to ensure the sum of the squares is between an allowed maximum and minimum values. FIG. 22 illustrates a graph 2200 showing a sum 2202 of squares of the signed sine signal 1402 and the signed cosine signal 1404 remaining between particular maximum limit 2204 and minimum limit 2206, in accordance with an example implementation. This indicates that the signals are reliable. If the sum 2202 does not remain between the maximum limit 2204 and the minimum limit 2206, this fifth check fails.

Referring back to FIG. 5, the motor controller 504 further includes a motor control module 530 in communication with the sensor signal processing module 528. In examples, the motor control module 530 can be included in the first processing core 510 or the second processing core 526, or as a separate module.

The motor control module 530 can include an inverter. For example, the inverter can be configured as a printed circuit boards (PCBs). APCB mechanically supports and electrically connects electronic components (e.g., microprocessors, integrated chips, capacitors, resistors, etc.) using conductive tracks, pads, and other features etched from one or more sheet layers of copper laminate onto and/or between sheet layers of a nonconductive substrate. Components are generally soldered onto the PCB to both electrically connect and mechanically fasten them to it.

The inverter can include a plurality of bus bars that are electrically-conductive and are configured to receive direct current (DC) power via cables connected to the electric motor connector 104 shown in FIG. 1. The DC power is then provided to components mounted to the inverter.

As an example, the DC power can be provided to the inverter from a battery. With this configuration, DC power is provided to the bus bars, which then transmit the power to other components of the inverter.

The inverter can be configured as a power converter that converts DC power received at the inverter to three-phase, alternating current (AC) power that can be provided to wire windings of the stator of the electric motor 100 to drive the electric motor 100. For example, the inverter can include a semiconductor switching matrix mounted to the inverter and configured to be electrically-connected to a positive DC terminal and to a negative DC terminal.

The semiconductor switching matrix can include any arrangement of semiconductor switching devices that supports DC to three-phase power conversion. For example, the semiconductor switching matrix can include a three-phase, with bridge elements electrically-coupled to input DC terminals and connected to three-phase AC output terminals.

In an example, the semiconductor switching matrix includes a plurality of transistors (e.g., an Insulated Gate Bipolar Transistor or a metal-oxide-semiconductor field-effect transistor). The transistors are switchable between an activated or "on" state and a deactivated or "off" state, e.g., via a pulse width modulated (PWM) signal provided by a microprocessor of the motor controller 504.

As the transistors of the semiconductor switching matrix are activated and deactivated at particular times via the PWM signal, AC voltage waveforms are generated at the AC output terminals. As such, the voltage waveforms at the AC output terminals are pulse width modulated and swing between voltage potential DC+ and voltage potential DC−. The AC voltage waveforms are then provided to the wire windings of the stator to drive the electric motor 100.

The sensor signal processing module 528 is configured to provide information to the motor control module 530 indicating whether the speed and direction signals generated by the resolver-to-digital converter 502 are reliable and thus whether the electric motor 100 should operate in a normal mode of operation. For example, if the outputs of the resolver speed monitor 1900 and the resolver direction monitor 2000 indicate that the signals from the resolver-to-digital converter 502 are reliable and/or the signals pass all the five signal integrity checks described above, the sensor signal processing module 528 indicates to the motor control module 530 to operate normally. Operating normally may include implementing closed-loop feedback loops to control speed and torque of the electric motor 100 using the position, speed, and direction signals provided by the resolver-to-digital converter 502.

If not (i.e., if the outputs of the resolver speed monitor 1900 and the resolver direction monitor 2000 indicate that the signals from the resolver-to-digital converter 502 are not reliable or any of the signal checks fail), the sensor signal processing module 528 indicates to the motor control module 530 to operate in a safe mode or reduced performance mode. In a safe or reduced performance mode, the motor control module 530 might relay on other speed sensors in the system as opposed to the resolver 200, and may limit the speed and torque provided by the electric motor 100 so as to operate the system safely and allow it to be placed in a safe state, e.g., allow implements of a hydraulic machinery to be positioned in a safe position on the ground, or allow a car of machine to stop, etc. In an example, operating the electric motor 100 in a safe mode includes stopping the electric motor 100 to ensure safety of the system. In another example, operating in the safe mode may include operating the electric motor 100 in a coasting state while producing zero torque. In another example, operating in the safe mode may include operating the electric motor 100 based on an independent motor speed sensor, and the electric motor 100 may be commanded to operate at a reduced performance level below a predefined speed limit.

Components of the control system 500 may be configured to work in an interconnected fashion with each other and/or with other components coupled to respective systems. One or more of the described operations or components of the control system 500 may be divided up into additional operational or physical components, or combined into fewer operational or physical components. In some further examples, additional operational and/or physical components may be added to the control system 500. Still further, any of the components or modules of the control system 500 may include or be provided in the form of a processor (e.g., a microprocessor, a digital signal processor, etc.) configured to execute program code including one or more instructions for implementing logical operations described herein. The control system 500 may further include any type of computer readable medium (non-transitory medium) or memory, for example, such as a storage device including a disk or hard drive, to store the program code that when executed by one or more processors cause the control system 500 to perform the operations described above. In an example, the control system 500 may be included within other systems.

Figure 23:
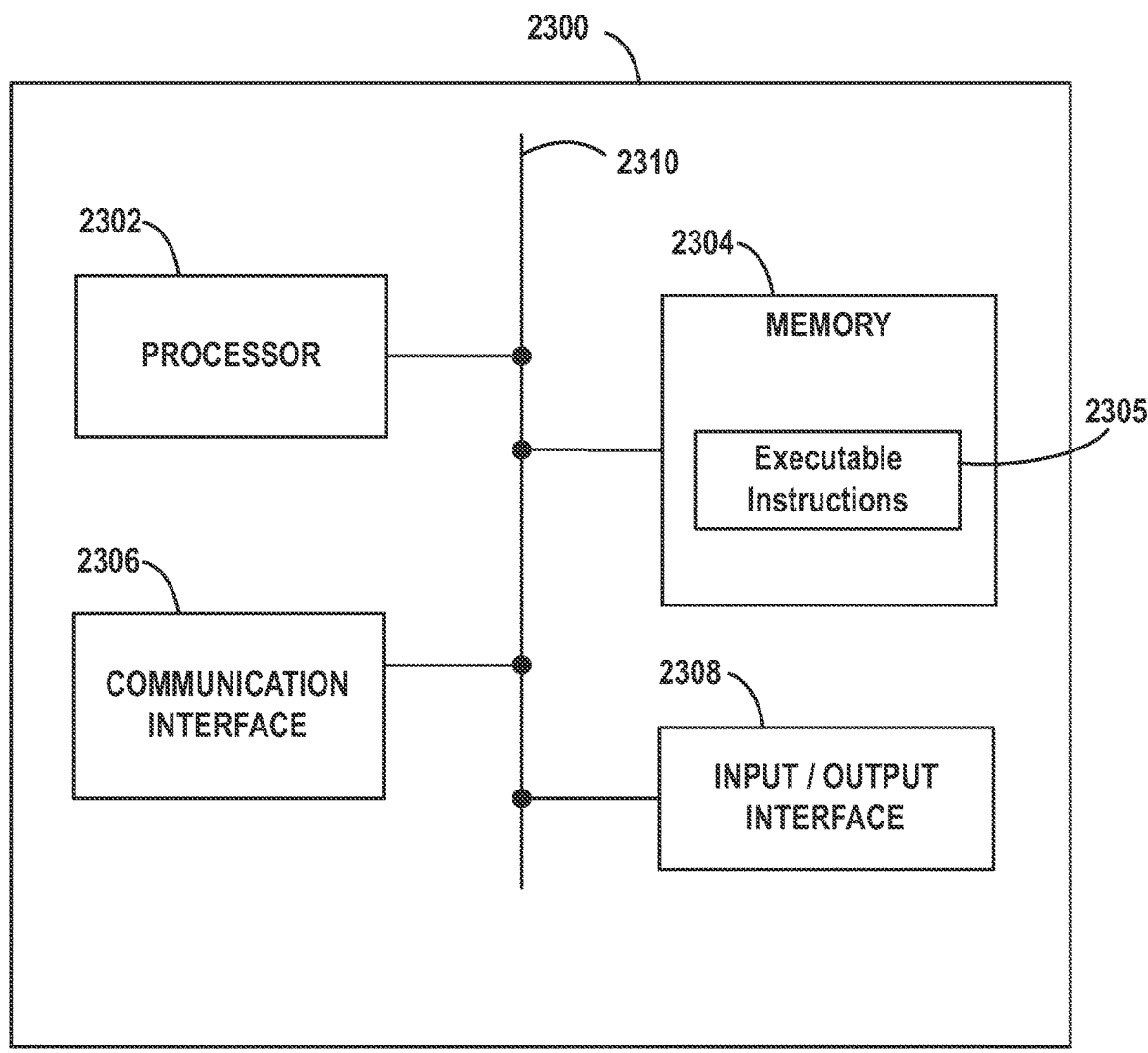
FIG. 23 illustrates a block diagram exemplifying a computing device, in accordance with an example implementation.

FIG. 23 illustrates a block diagram exemplifying a computing device 2300, in accordance with an example implementation. The computing device 2300 represents, for example, any of the controllers or devices described above such as the resolver-to-digital converter 502, the carrier frequency generator 506, the motor controller 504, the first processing core 510, the second processing core 526, the motor control module 530, etc.

The computing device 2300 includes a processor 2302, a data storage or memory 2304 have stored thereon executable instructions 2305 that are executable by the processor 2302, communication interface 2306, and an input/output interface 2308, all of which may be coupled by a bus 2310 or a similar mechanism. In some embodiments, computing device 2300 may include other components and/or peripheral devices (e.g., detachable storage, etc.).

The processor 2302 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, the processor 2302 may be one or more single-core processors. In other cases, the processor 2302 may be one or more multi-core processors with multiple independent processing units (e.g., the first processing core 510 and the second processing core 526). The processor 2302 may also include register memory for temporarily storing instructions being executed and related data, as well as cache memory for temporarily storing recently-used instructions and data.

The memory 2304 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, the memory 2304 represents both main memory units, as well as long-term storage.

The memory 2304 stores thereon the executable instructions 2305 and data on which the executable instructions 2305 may operate. By way of example, the memory 2304 may store the executable instructions 2305 on a non-transitory computer-readable medium, such that the instructions are executable by the processor 2302 to carry out any of the methods, processes, or operations disclosed in this specification or the accompanying drawings. The memory 2304 can also include the operating system of the computing device 2300 and various software modules, firmware, and applications.

The communication interface 2306 allows the computing device 2300 to communicate with various networks (e.g., the internet, a CAN network, a proprietary network, etc.). The communication interface 2306 may take the form of one or more wireline interfaces, such as Ethernet (e.g., Fast Ethernet, Gigabit Ethernet, and so on). The communication interface 2306 may also support communication over one or more non-Ethernet media, such as coaxial cables or power lines, or over wide-area media, such as Synchronous Optical Networking (SONET) or digital subscriber line (DSL) technologies. The communication interface 2306 may additionally take the form of one or more wireless interfaces, such as IEEE 802.11 (Wi-Fi), BLUETOOTH®, global positioning system (GPS), or a wide-area wireless interface. However, other forms of physical layer interfaces and other types of standard or proprietary communication protocols may be used over the communication interface 2306. Furthermore, the communication interface 2306 may comprise multiple physical interfaces. For instance, some implementations of the computing device 2300 may include Ethernet, BLUETOOTH®, and Wi-Fi interfaces.

The input/output interface 2308 may facilitate user and peripheral device interaction with computing device 2300. The input/output interface 2308 may include one or more types of input devices, such as a keyboard, a mouse, a touch screen, and so on. Similarly, the input/output interface 2308 may include one or more types of output devices, such as a screen, monitor, printer, and/or one or more light emitting diodes (LEDs). Additionally or alternatively, the computing device 2300 may communicate with other devices using a universal serial bus (USB) or high-definition multimedia interface (HDMI) port interface, for example.

Figure 24:
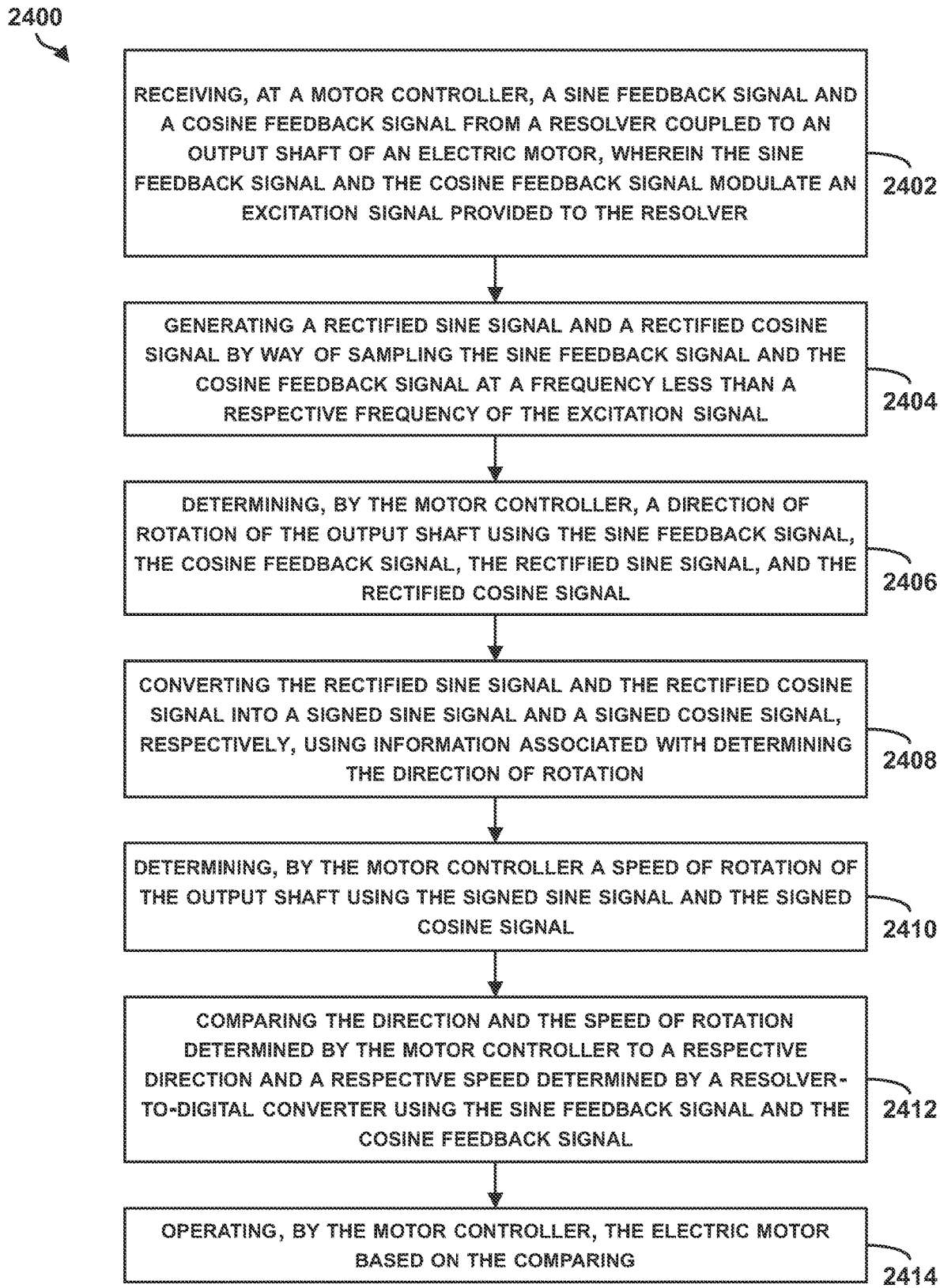
FIG. 24 is a flowchart for operating an electric motor, in accordance with an example implementation.

FIG. 24 is a flowchart of a method 2400 for operating an electric motor, in accordance with an example implementation. The method 2400 can, for example, be performed by the control system 500 (e.g., by the motor controller 504) to control the electric motor 100.

The method 2400 may include one or more operations, or actions as illustrated by one or more of blocks 2402-2414. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 2400 and other processes and operations disclosed herein, the flowchart shows operation of one possible implementation of present examples. In this regard, each block may represent a module, a segment, or a portion of program code, which includes one or more instructions executable by processors (e.g., processing cores of the motor controller 504) for implementing specific logical operations or steps in the process. The program code may be stored on any type of computer readable medium or memory, for example, such as a storage device including a disk or hard drive. The computer readable medium may include a non-transitory computer readable medium or memory, for example, such as computer-readable media that stores data for short periods of time like register memory, processor cache and Random Access Memory (RAM). The computer readable medium may also include non-transitory media or memory, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example. In addition, for the method 2400 and other processes and operations disclosed herein, one or more blocks in FIG. 24 may represent circuitry or digital logic that is arranged to perform the specific logical operations in the process.

At block 2402, the method 2400 includes receiving, at a motor controller (e.g., the motor controller 504), a sine feedback signal (e.g., the sine feedback signal 400) and a cosine feedback signal (e.g., the cosine feedback signal 402) from a resolver (e.g., the resolver 200) coupled to an output shaft (e.g., the output shaft 106) of an electric motor (e.g., the electric motor 100), wherein the sine feedback signal and the cosine feedback signal modulate an excitation signal (e.g., the excitation signal 308) provided to the resolver. For the example, the carrier frequency generator 506 can provide a carrier frequency via the SPI 508 to the resolver-to-digital converter 502, which generate the excitation signal 308 having the carrier frequency.

At block 2404, the method 2400 includes generating a rectified sine signal (e.g., the rectified sine signal 902) and a rectified cosine signal (e.g., the rectified cosine signal 904) by way of sampling the sine feedback signal and the cosine feedback signal at a frequency less than a respective frequency of the excitation signal (e.g., frequency that is at least 1.6 times less than the carrier frequency). For example, the motor controller can generate, from the sine feedback signal and the cosine feedback signal, a sine data buffer (e.g., the sine data buffer 512) and a cosine data buffer (e.g., the cosine data buffer 514) having data points sampled at the frequency less than the respective frequency of the excitation signal (e.g., the excitation signal 308), wherein generating the rectified sine signal and the rectified cosine signal is based on the sine data buffer and the cosine data buffer (see FIGS. 5-6).

In an example, as described above with respect to FIG. 5, generating the sine data buffer and the cosine data buffer can include using respective analog-to-digital converters (e.g., the sine ADC 516 and the cosine ADC 520) to convert the sine feedback signal into and the cosine feedback signal into respective discrete values; and filtering (e.g., using the sine filter 518 and the cosine filter 522) respective outputs of the ADCs at the frequency less than the respective frequency of the excitation signal.

Further, generating the rectified sine signal and the rectified cosine signal is such that amplitudes of the rectified sine signal and the rectified cosine signal are proportional to respective amplitudes of the sine feedback signal and the cosine feedback signal. For example, as described above with respect to FIGS. 7-9, the amplitude extraction module 702 identifies a positive or negative half-cycle in each data buffer, and sums absolute values of data points composing the positive or negative half-cycle.

At block 2406, the method 2400 includes determining, by the motor controller, a direction of rotation of the output shaft using the sine feedback signal, the cosine feedback signal, the rectified sine signal, and the rectified cosine signal. For example, the direction extraction module 704 generates a first logic signal (e.g., the first logic signal 1002 in FIG. 10) indicating when the rectified cosine signal exceeds the rectified sine signal and when the rectified sine signal exceeds the rectified cosine signal, and generates a second logic signal (e.g., the second logic signal 1102, 1202 in FIGS. 11-12) indicating when a product of the sine feedback signal and the cosine feedback signal is positive and when the product is negative, wherein determining the direction of rotation of the output shaft of the electric motor is based on the first logic signal and the second logic signal. For instance, direction extraction module 704 determines the direction of rotation based on the value or level of the second logic signal and the signal edge of the first logic signal as described above.

At block 2408, the method 2400 includes converting the rectified sine signal and the rectified cosine signal into a signed sine signal (e.g., the signed sine signal 1402, 1602) and a signed cosine signal (e.g., the signed cosine signal 1404, 1604), respectively, using information associated with determining the direction of rotation (e.g., using the first logic signal 1002 and the second logic signal 1102, 1202). For example, the speed extraction module 706 (i) generates a state signal (e.g., the state signal 1302, 1502 in FIG. 13; see table 1 above) corresponding to the first logic signal and the second logic signal, (ii) generates a toggle signal (e.g., the toggle signal 1304, 1504) that distinguishes between a first 180 degrees (i.e., the first half of rotation) and a second 180 degrees (i.e., the second half of rotation) of the sine feedback signal and the cosine feedback signal, and (iii) determines cosine multipliers and sine multipliers (see tables 2-3 above) based on the state signal and toggle signal, wherein converting the rectified sine signal and the rectified cosine signal into the signed sine signal and the signed cosine signal is based on the cosine multipliers and the sine multipliers (see FIGS. 14, 16).

At block 2410, the method 2400 includes determining, by the motor controller a speed of rotation of the output shaft using the signed sine signal and the signed cosine signal. For example, the speed extraction module 706 filters the signed sine signal and the signed cosine signal through a low-pass filter to generate the filtered sine signal 1702 and the filtered cosine signal 1704 (see FIG. 17). In an example, the speed extraction module 706 can then process the filtered sine signal and the filtered cosine signal through a tracking phase-locked loop (e.g., the tracking PLL 1800) to generate the speed signal 1831.

At block 2412, the method 2400 includes comparing the direction and the speed of rotation determined by the motor controller to a respective direction and a respective speed determined by a resolver-to-digital converter (e.g., the resolver-to-digital converter 502) using the sine feedback signal and the cosine feedback signal. For example, as described above with respect to the resolver speed monitor 1900, the sensor signal processing module 528 determines a magnitude of a difference between the speed determined by the motor controller and the respective speed determined by the resolver-to-digital converter. Also, as described above with respect to the resolver direction monitor 2000, the sensor signal processing module 528 compares the direction of rotation determined by the motor controller to the respective direction of rotation determined by the resolver-to-digital converter to determine whether they are the same or not.

At block 2414, the method 2400 includes operating, by the motor controller, the electric motor based on the comparing. For example, as described above with respect to FIG. 19, if the difference in speed is less than the threshold difference 1907 or if the difference exceeds the threshold difference 1907 for a time period less than the threshold duration 1917 of time, the resolver speed monitor 1900 provides an indication to operate the electric motor in a normal mode of operation (e.g., relying on the speed and direction of rotation determined by the resolver-to-digital converter in operating the electric motor). If the difference exceeds the threshold difference 1907 for more than the threshold duration 1917 of time, the resolver speed monitor 1900 provides an indication to operate the electric motor in a safe mode of operation (e.g., a reduced performance mode).

Similarly, regarding direction as described with respect to FIG. 20, if the direction of rotation determined by the motor controller is same as the respective direction of rotation determined by the resolver-to-digital converter or if the direction of rotation determined by the motor controller is different from the respective direction of rotation determined by the resolver-to-digital converter for a time period less than the threshold duration 2017 of time, the resolver direction monitor 2000 provides an indication to operate the electric motor in a normal mode of operation. If the direction of rotation determined by the motor controller is different from the respective direction of rotation determined by the resolver-to-digital converter for more than the threshold duration 2017 of time, the resolver direction monitor 2000 provides an indication to operate the electric motor in a safe mode of operation.

The method can include additional operations that may be executed and performed with the method 2400 as described throughout herein. As an example, the method can further include performing the five signal integrity checks described above. If the signal checks fail, the sensor signal processing module 528 indicates to the motor control module 530 to operate in a safe mode or reduced performance mode.

The detailed description above describes various features and operations of the disclosed systems with reference to the accompanying figures. The illustrative implementations described herein are not meant to be limiting. Certain aspects of the disclosed systems can be arranged and combined in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Further, devices or systems may be used or configured to perform functions presented in the figures. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide The arrangements described herein are for purposes of example only. As such, those skilled in the art will appreciate that other arrangements and other elements (e.g., machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. Also, the terminology used herein is for the purpose of describing particular implementations only, and is not intended to be limiting.

Embodiments of the present disclosure can thus relate to one of the enumerated example embodiments (EEEs) listed below.

EEE 1 is a method comprising: receiving, at a motor controller, a sine feedback signal and a cosine feedback signal from a resolver coupled to an output shaft of an electric motor, wherein the sine feedback signal and the cosine feedback signal modulate an excitation signal provided to the resolver; generating a rectified sine signal and a rectified cosine signal by way of sampling the sine feedback signal and the cosine feedback signal at a frequency less than a respective frequency of the excitation signal; determining, by the motor controller, a direction of rotation of the output shaft using the sine feedback signal, the cosine feedback signal, the rectified sine signal, and the rectified cosine signal; converting the rectified sine signal and the rectified cosine signal into a signed sine signal and a signed cosine signal, respectively, using information associated with determining the direction of rotation; determining, by the motor controller a speed of rotation of the output shaft using the signed sine signal and the signed cosine signal; comparing the direction and the speed of rotation determined by the motor controller to a respective direction and a respective speed determined by a resolver-to-digital converter using the sine feedback signal and the cosine feedback signal; and operating, by the motor controller, the electric motor based on the comparing.

EEE 2 is the method of EEE 1, further comprising: generating, from the sine feedback signal and the cosine feedback signal, a sine data buffer and a cosine data buffer having data points sampled at the frequency less than the respective frequency of the excitation signal, wherein generating the rectified sine signal and the rectified cosine signal is based on the sine data buffer and the cosine data buffer.

EEE 3 is the method of EEE 2, wherein generating the sine data buffer and the cosine data buffer comprises: using respective analog-to-digital converters (ADCs) to convert the sine feedback signal into and the cosine feedback signal into respective discrete values; and filtering respective outputs of the ADCs at the frequency less than the respective frequency of the excitation signal.

EEE 4 is the method of any of EEEs 2-3, wherein generating the rectified sine signal and the rectified cosine signal is such that amplitudes of the rectified sine signal and the rectified cosine signal are proportional to respective amplitudes of the sine feedback signal and the cosine feedback signal.

EEE 5 is the method of EEE 4, wherein generating the rectified sine signal and the rectified cosine signal such that amplitudes of the rectified sine signal and the rectified cosine signal are proportional to respective amplitudes of the sine feedback signal and the cosine feedback signal comprises: identifying a positive or negative half-cycle, whichever occurs first, in each data buffer; and summing absolute values of data points composing the positive or negative half-cycle.

EEE 6 is the method of any of EEEs 1-5, wherein determining the direction of rotation of the output shaft of the electric motor comprises: generating a first logic signal indicating when the rectified cosine signal exceeds the rectified sine signal and when the rectified sine signal exceeds the rectified cosine signal; and generating a second logic signal indicating when a product of the sine feedback signal and the cosine feedback signal is positive and when the product is negative, wherein determining the direction of rotation of the output shaft of the electric motor is based on the first logic signal and the second logic signal.

EEE 7 is the method of EEE 6, wherein converting the rectified sine signal and the rectified cosine signal into the signed sine signal and the signed cosine signal, respectively, using information associated with determining the direction of rotation comprises: generating a state signal corresponding to the first logic signal and the second logic signal; generating a toggle signal that distinguishes between a first 180 degrees and a second 180 degrees of the sine feedback signal and the cosine feedback signal; and determining cosine multipliers and sine multipliers based on the state signal and toggle signal, wherein converting the rectified sine signal and the rectified cosine signal into the signed sine signal and the signed cosine signal is based on the cosine multipliers and the sine multipliers.

EEE 8 is the method of any of EEEs 1-7, wherein determining the speed of rotation of the output shaft comprises: filtering the signed sine signal and the signed cosine signal through a low-pass filter to generate a filtered sine signal and a filtered cosine signal.

EEE 9 is the method of EEE 8, wherein determining the speed of rotation of the output shaft further comprises: processing the filtered sine signal and the filtered cosine signal through a tracking phase-locked loop.

EEE 10 is the method of any of EEEs 1-9, wherein comparing the speed of rotation of the output shaft determined by the motor controller to the respective speed determined by the resolver-to-digital converter comprises: determining a magnitude of a difference between the speed determined by the motor controller and the respective speed determined by the resolver-to-digital converter, wherein operating the electric motor based on the comparing comprises: if the difference is less than a threshold difference or if the difference exceeds the threshold difference for a time period less than a threshold duration of time, providing an indication to operate the electric motor in a normal mode of operation, and if the difference exceeds the threshold difference for more than the threshold duration of time, providing an indication to operate the electric motor in a safe mode of operation.

EEE 11 is the method of any of EEEs 1-10, wherein operating the electric motor based on the comparing of the direction of rotation determined by the motor controller to the respective direction of rotation determined by the resolver-to-digital converter comprises: if the direction of rotation determined by the motor controller is same as the respective direction of rotation determined by the resolver-to-digital converter or if the direction of rotation determined by the motor controller is different from the respective direction of rotation determined by the resolver-to-digital converter for a time period less than a threshold duration of time, providing an indication to operate the electric motor in a normal mode of operation, and if the direction of rotation determined by the motor controller is different from the respective direction of rotation determined by the resolver-to-digital converter for more than the threshold duration of time, providing an indication to operate the electric motor in a safe mode of operation.

EEE 12 is the method of any of EEEs 1-11, further comprising: generating, from the sine feedback signal and the cosine feedback signal, a sine data buffer and a cosine data buffer having data points sampled at the frequency less than the respective frequency of the excitation signal; and performing a signal integrity check on the sine feedback signal and the cosine feedback signal comprising: determining whether particular data points in a given sine data buffer or cosine data buffer have changed compared to respective data points in two previous sine data buffers or cosine data buffers, wherein operating the electric motor is further based on the signal integrity check.

EEE 13 is the method of any of EEEs 1-12, further comprising: generating, from the sine feedback signal and the cosine feedback signal, a sine data buffer and a cosine data buffer having data sampled at the frequency less than the respective frequency of the excitation signal; extracting, from the sine data buffer and the cosine data buffer, a maximum sine value, a minimum sine value, a maximum cosine value, and a minimum cosine value; and performing a signal integrity check on the sine feedback signal and the cosine feedback signal comprising: determining whether respective magnitudes of the maximum sine value, the minimum sine value, the maximum cosine value, and the minimum cosine value are less than an allowed value, wherein operating the electric motor is further based on the signal integrity check.

EEE 14 is the method of any of EEEs 1-13, further comprising: generating, from the sine feedback signal and the cosine feedback signal, a sine data buffer and a cosine data buffer having data sampled at the frequency less than the respective frequency of the excitation signal; extracting, from the sine data buffer and the cosine data buffer, a maximum sine value, a minimum sine value, a maximum cosine value, and a minimum cosine value; and performing a signal integrity check on the sine feedback signal and the cosine feedback signal comprising: determining whether (i) a difference between a magnitude of the maximum sine value and a magnitude of the minimum sine value is less than an allowed value, and (ii) a difference between a magnitude of the maximum cosine value and a magnitude of the minimum cosine value is less than an allowed value, wherein operating the electric motor is further based on the signal integrity check.

EEE 15 is the method of any of EEEs 1-14, further comprising: determining a square of the rectified sine signal and a square of the rectified cosine signal; determining a sum of squares of the rectified sine signal and the rectified cosine signal; and performing a signal integrity check comprising: determining whether the sum of squares is constrained between an allowed maximum value and an allowed minimum value, wherein operating the electric motor is further based on the signal integrity check.

EEE 16 is the method of any of EEEs 1-15, further comprising: determining a square of the signed sine signal and a square of the signed cosine signal; determining a sum of squares of the signed sine signal and the signed cosine signal; and performing a signal integrity check comprising: determining whether the sum of squares is constrained between an allowed maximum value and an allowed minimum value, wherein operating the electric motor is further based on the signal integrity check.

EEE 17 is an electric motor comprising: a resolver comprising: (i) a resolver stator having a primary coil, a sine coil, and a cosine coil, and (ii) a resolver rotor mounted to, and configured to rotate with, an output shaft of the electric motor, wherein the resolver rotor comprises a secondary coil; a resolver-to-digital converter configured to (i) provide an excitation signal to the primary coil of the resolver stator, wherein the excitation signal excites the secondary coil of the resolver rotor, thereby generating a sine feedback signal in the sine coil and a cosine feedback signal in the cosine coil, (ii) receive the sine feedback signal and the cosine feedback signal, and (iii) determine a direction and a speed of rotation of the output shaft using the sine feedback signal and the cosine feedback signal; and a motor controller comprising one or more processors, and a non-transitory computer-readable medium storing thereon instructions that, when executed by the one or more processors, cause the motor controller to perform operations comprising: receiving the sine feedback signal and the cosine feedback signal, generating a rectified sine signal and a rectified cosine signal by way of sampling the sine feedback signal and the cosine feedback signal at a frequency less than a respective frequency of the excitation signal, determining a respective direction of rotation of the output shaft using the sine feedback signal, the cosine feedback signal, the rectified sine signal, and the rectified cosine signal, converting the rectified sine signal and the rectified cosine signal into a signed sine signal and a signed cosine signal, respectively, using information associated with determining the respective direction of rotation, determining a respective speed of rotation of the output shaft using the signed sine signal and the signed cosine signal, comparing the respective direction and the respective speed determined by the motor controller to the direction and the speed of rotation determined by the resolver-to-digital converter, and operating the electric motor based on the comparing.

EEE 18 is the electric motor of EEE 17, wherein comparing the respective speed of rotation of the output shaft determined by the motor controller to the speed determined by the resolver-to-digital converter comprises: determining a magnitude of a difference between the respective speed determined by the motor controller and the speed determined by the resolver-to-digital converter, wherein operating the electric motor based on the comparing comprises: if the difference is less than a threshold difference or if the difference exceeds the threshold difference for a time period less than a threshold duration of time, providing an indication to operate the electric motor in a normal mode of operation, and if the difference exceeds the threshold difference for more than the threshold duration of time, providing an indication to operate the electric motor in a safe mode of operation.

EEE 19 is the electric motor of any of EEEs 17-18, wherein operating the electric motor based on the comparing of the respective direction of rotation determined by the motor controller to the direction of rotation determined by the resolver-to-digital converter comprises: if the respective direction of rotation determined by the motor controller is same as the direction of rotation determined by the resolver-to-digital converter or if the respective direction of rotation determined by the motor controller is different from the direction of rotation determined by the resolver-to-digital converter for a time period less than a threshold duration of time, providing an indication to operate the electric motor in a normal mode of operation, and if the respective direction of rotation determined by the motor controller is different from the direction of rotation determined by the resolver-to-digital converter for more than the threshold duration of time, providing an indication to operate the electric motor in a safe mode of operation.

EEE 20 is the electric motor of EEE 19, wherein: operating the electric motor in the normal mode of operation comprises relying on the speed and direction of rotation determined by the resolver-to-digital converter in operating the electric motor, and operating the electric motor in the safe mode of operation comprises reducing performance of the electric motor.

What is claimed is:

1. A method comprising:
receiving, at a motor controller, a sine feedback signal and a cosine feedback signal from a resolver coupled to an output shaft of an electric motor, wherein the sine feedback signal and the cosine feedback signal modulate an excitation signal provided to the resolver;
generating a rectified sine signal and a rectified cosine signal by way of sampling the sine feedback signal and the cosine feedback signal at a frequency less than a respective frequency of the excitation signal;
determining, by the motor controller, a direction of rotation of the output shaft using the sine feedback signal, the cosine feedback signal, the rectified sine signal, and the rectified cosine signal;
converting the rectified sine signal and the rectified cosine signal into a signed sine signal and a signed cosine signal, respectively, using information associated with determining the direction of rotation;
determining, by the motor controller a speed of rotation of the output shaft using the signed sine signal and the signed cosine signal;
comparing the direction and the speed of rotation determined by the motor controller to a respective direction and a respective speed determined by a resolver-to-digital converter using the sine feedback signal and the cosine feedback signal; and
operating, by the motor controller, the electric motor based on the comparison comparing.

2. The method of claim 1, further comprising:
generating, from the sine feedback signal and the cosine feedback signal, a sine data buffer and a cosine data buffer having data points sampled at the frequency less than the respective frequency of the excitation signal, wherein generating the rectified sine signal and the rectified cosine signal is based on the sine data buffer and the cosine data buffer.

3. The method of claim 2, wherein generating the sine data buffer and the cosine data buffer comprises:
using respective analog-to-digital converters (ADCs) to convert the sine feedback signal into and the cosine feedback signal into respective discrete values; and
filtering respective outputs of the ADCs at the frequency less than the respective frequency of the excitation signal.

4. The method of claim 2, wherein generating the rectified sine signal and the rectified cosine signal is such that amplitudes of the rectified sine signal and the rectified cosine signal are proportional to respective amplitudes of the sine feedback signal and the cosine feedback signal.

5. The method of claim 4, wherein generating the rectified sine signal and the rectified cosine signal such that amplitudes of the rectified sine signal and the rectified cosine signal are proportional to respective amplitudes of the sine feedback signal and the cosine feedback signal comprises:
identifying a positive or negative half-cycle, whichever occurs first, in each data buffer; and
summing absolute values of data points composing the positive or negative half-cycle.

6. The method of claim 1, wherein determining the direction of rotation of the output shaft of the electric motor comprises:
generating a first logic signal indicating when the rectified cosine signal exceeds the rectified sine signal and when the rectified sine signal exceeds the rectified cosine signal; and
generating a second logic signal indicating when a product of the sine feedback signal and the cosine feedback signal is positive and when the product is negative, wherein determining the direction of rotation of the output shaft of the electric motor is based on the first logic signal and the second logic signal.

7. The method of claim 6, wherein converting the rectified sine signal and the rectified cosine signal into the signed sine signal and the signed cosine signal, respectively, using information associated with determining the direction of rotation comprises:
generating a state signal corresponding to the first logic signal and the second logic signal;
generating a toggle signal that distinguishes between a first 180 degrees and a second 180 degrees of the sine feedback signal and the cosine feedback signal; and
determining cosine multipliers and sine multipliers based on the state signal and toggle signal, wherein converting the rectified sine signal and the rectified cosine signal into the signed sine signal and the signed cosine signal is based on the cosine multipliers and the sine multipliers.

8. The method of claim 1, wherein determining the speed of rotation of the output shaft comprises:
filtering the signed sine signal and the signed cosine signal through a low-pass filter to generate a filtered sine signal and a filtered cosine signal.

9. The method of claim 8, wherein determining the speed of rotation of the output shaft further comprises:
processing the filtered sine signal and the filtered cosine signal through a tracking phase-locked loop.

10. The method of claim 1, wherein comparing the speed of rotation of the output shaft determined by the motor controller to the respective speed determined by the resolver-to-digital converter comprises:
determining a magnitude of a difference between the speed determined by the motor controller and the respective speed determined by the resolver-to-digital converter, wherein operating the electric motor based on the comparing comprises:
if the difference is less than a threshold difference or if the difference exceeds the threshold difference for a time period less than a threshold duration of time, providing an indication to operate the electric motor in a normal mode of operation, and
if the difference exceeds the threshold difference for more than the threshold duration of time, providing an indication to operate the electric motor in a safe mode of operation.

11. The method of claim 1, wherein operating the electric motor based on the comparing of the direction of rotation determined by the motor controller to the respective direction of rotation determined by the resolver-to-digital converter comprises:
if the direction of rotation determined by the motor controller is same as the respective direction of rotation determined by the resolver-to-digital converter or if the direction of rotation determined by the motor controller is different from the respective direction of rotation determined by the resolver-to-digital converter for a time period less than a threshold duration of time, providing an indication to operate the electric motor in a normal mode of operation, and
if the direction of rotation determined by the motor controller is different from the respective direction of rotation determined by the resolver-to-digital converter for more than the threshold duration of time, providing an indication to operate the electric motor in a safe mode of operation.

12. The method of claim 1, further comprising:
generating, from the sine feedback signal and the cosine feedback signal, a sine data buffer and a cosine data buffer having data points sampled at the frequency less than the respective frequency of the excitation signal; and
performing a signal integrity check on the sine feedback signal and the cosine feedback signal comprising: determining whether particular data points in a given sine data buffer or cosine data buffer have changed compared to respective data points in two previous sine data buffer or cosine data buffer, wherein operating the electric motor is further based on the signal integrity check.

13. The method of claim 1, further comprising:
generating, from the sine feedback signal and the cosine feedback signal, a sine data buffer and a cosine data buffer having data sampled at the frequency less than the respective frequency of the excitation signal;
extracting, from the sine data buffer and the cosine data buffer, a maximum sine value, a minimum sine value, a maximum cosine value, and a minimum cosine value; and
performing a signal integrity check on the sine feedback signal and the cosine feedback signal comprising: determining whether respective magnitudes of the maximum sine value, the minimum sine value, the maximum cosine value, and the minimum cosine value are less than an allowed value, wherein operating the electric motor is further based on the signal integrity check.

14. The method of claim 1, further comprising:
generating, from the sine feedback signal and the cosine feedback signal, a sine data buffer and a cosine data buffer having data sampled at the frequency less than the respective frequency of the excitation signal;
extracting, from the sine data buffer and the cosine data buffer, a maximum sine value, a minimum sine value, a maximum cosine value, and a minimum cosine value; and
performing a signal integrity check on the sine feedback signal and the cosine feedback signal comprising: determining whether (i) a difference between a magnitude of the maximum sine value and a magnitude of the minimum sine value is less than an allowed value, and (ii) a difference between a magnitude of the maximum cosine value and a magnitude of the minimum cosine value is less than an allowed value, wherein operating the electric motor is further based on the signal integrity check.

15. The method of claim 1, further comprising:
determining a square of the rectified sine signal and a square of the rectified cosine signal;
determining a sum of squares of the rectified sine signal and the rectified cosine signal; and
performing a signal integrity check comprising: determining whether the sum of squares is constrained between an allowed maximum value and an allowed minimum value, wherein operating the electric motor is further based on the signal integrity check.

16. The method of claim 1, further comprising:
determining a square of the signed sine signal and a square of the signed cosine signal;
determining a sum of squares of the signed sine signal and the signed cosine signal; and
performing a signal integrity check comprising: determining whether the sum of squares is constrained between an allowed maximum value and an allowed minimum value, wherein operating the electric motor is further based on the signal integrity check.

17. An electric motor comprising:
a resolver comprising: (i) a resolver stator having a primary coil, a sine coil, and a cosine coil, and (ii) a resolver rotor mounted to, and configured to rotate with, an output shaft of the electric motor, wherein the resolver rotor comprises a secondary coil;
a resolver-to-digital converter configured to (i) provide an excitation signal to the primary coil of the resolver stator, wherein the excitation signal excites the secondary coil of the resolver rotor, thereby generating a sine feedback signal in the sine coil and a cosine feedback signal in the cosine coil, (ii) receive the sine feedback signal and the cosine feedback signal, and (iii) determine a direction and a speed of rotation of the output shaft using the sine feedback signal and the cosine feedback signal; and a motor controller comprising one or more processors, and a non-transitory computer-readable medium storing thereon instructions that, when executed by the one or more processors, cause the motor controller to perform operations comprising:
receiving the sine feedback signal and the cosine feedback signal,
generating a rectified sine signal and a rectified cosine signal by way of sampling the sine feedback signal and the cosine feedback signal at a frequency less than a respective frequency of the excitation signal,
determining a respective direction of rotation of the output shaft using the sine feedback signal, the cosine feedback signal, the rectified sine signal, and the rectified cosine signal,
converting the rectified sine signal and the rectified cosine signal into a signed sine signal and a signed cosine signal, respectively, using information associated with determining the respective direction of rotation,
determining a respective speed of rotation of the output shaft using the signed sine signal and the signed cosine signal,
comparing the respective direction and the respective speed determined by the motor controller to the direction and the speed of rotation determined by the resolver-to-digital converter, and
operating the electric motor based on the comparison.

18. The electric motor of claim 17, wherein comparing the respective speed of rotation of the output shaft determined by the motor controller to the speed determined by the resolver-to-digital converter comprises:
determining a magnitude of a difference between the respective speed determined by the motor controller and the speed determined by the resolver-to-digital converter, wherein operating the electric motor based on the comparing comprises:
if the difference is less than a threshold difference or if the difference exceeds the threshold difference for a time period less than a threshold duration of time, providing an indication to operate the electric motor in a normal mode of operation, and
if the difference exceeds the threshold difference for more than the threshold duration of time, providing an indication to operate the electric motor in a safe mode of operation.

19. The electric motor of claim 17, wherein operating the electric motor based on the comparing of the respective direction of rotation determined by the motor controller to the direction of rotation determined by the resolver-to-digital converter comprises:
if the respective direction of rotation determined by the motor controller is same as the direction of rotation determined by the resolver-to-digital converter or if the respective direction of rotation determined by the motor controller is different from the direction of rotation determined by the resolver-to-digital converter for a time period less than a threshold duration of time, providing an indication to operate the electric motor in a normal mode of operation, and
if the respective direction of rotation determined by the motor controller is different from the direction of rotation determined by the resolver-to-digital converter for more than the threshold duration of time, providing an indication to operate the electric motor in a safe mode of operation.

20. The electric motor of claim 19, wherein:
operating the electric motor in the normal mode of operation comprises relying on the speed and direction of rotation determined by the resolver-to-digital converter in operating the electric motor, and
operating the electric motor in the safe mode of operation comprises reducing performance of the electric motor.

* * * * *